United States Patent
Kurokawa et al.

(10) Patent No.: US 7,457,612 B2
(45) Date of Patent: Nov. 25, 2008

(54) WIRELESS COMMUNICATION SYSTEM AND METHOD OF MAKING WIRELESS COMMUNICATION

(75) Inventors: Hideki Kurokawa, Tokyo (JP); Takahiro Kakumaru, Tokyo (JP); Shinichi Morimoto, Tokyo (JP)

(73) Assignee: Nec Corporation, Tokyo (JP)

( * ) Notice: Subject to any disclaimer, the term of this patent is extended or adjusted under 35 U.S.C. 154(b) by 608 days.

(21) Appl. No.: 10/714,898

(22) Filed: Nov. 18, 2003

(65) Prior Publication Data
US 2004/0097268 A1 May 20, 2004

(30) Foreign Application Priority Data
Nov. 18, 2002 (JP) ............................. 2002-334203

(51) Int. Cl.
*H04L 12/58* (2006.01)
(52) U.S. Cl. ................. 455/412.1; 455/412.2; 455/413; 455/414.1; 455/414.2
(58) Field of Classification Search ............. 455/412.1, 455/414.1, 127.5, 160.1, 456.4
See application file for complete search history.

(56) References Cited

U.S. PATENT DOCUMENTS

| | | | |
|---|---|---|---|
| 5,566,081 A | 10/1996 | Yoshizawa et al. | |
| 5,857,146 A | 1/1999 | Kiddo | |
| 6,006,101 A | 12/1999 | Sakamoto | |
| 7,155,262 B2 * | 12/2006 | Shoobridge | 455/574 |
| 2001/0029178 A1 * | 10/2001 | Criss et al. | 455/419 |
| 2006/0025161 A1 * | 2/2006 | Funato et al. | 455/458 |

FOREIGN PATENT DOCUMENTS

| | | |
|---|---|---|
| JP | 63-296419 | 12/1988 |
| JP | 6-140984 | 5/1994 |
| JP | 7-131404 | 5/1995 |
| JP | 8-172387 | 7/1996 |
| JP | 9-083427 | 3/1997 |
| JP | 9-275587 | 10/1997 |
| JP | 10-135893 | 5/1998 |
| JP | 11-136741 | 5/1999 |
| JP | 11-313370 | 11/1999 |
| JP | 2001-278165 A | 10/2000 |
| JP | 2001-186567 A | 7/2001 |
| JP | 2002-118874 A | 4/2002 |
| JP | 2002-164835 A | 6/2002 |
| JP | 2002-208887 A | 7/2002 |

* cited by examiner

*Primary Examiner*—Duc Nguyen
*Assistant Examiner*—Dai A Phuong
(74) *Attorney, Agent, or Firm*—Foley & Lardner LLP

(57) ABSTRACT

There is provided a wireless communication system including a radio-signal base station, and a mobile wireless terminal operating in a power-saving mode in which the mobile wireless terminal intermittently receives packet signals, and in a normal mode in which the mobile wireless terminal regularly receives packet signals. When the radio-signal base station receives packet signals addressed to a mobile wireless terminal being in the power-saving mode, the radio-signal base station temporarily stores the received packet signals. The mobile wireless terminal requests the radio-signal base station to transmit the packet signals thereto, receives a part of the packet signal from the radio-signal base station, and, if the mobile wireless terminal judges that it would be necessary to carry out real-time communication for receiving entirety of the packet signals, the mobile wireless terminal transfers to the normal mode from the power-saving mode for receiving entirety of the packet signals.

38 Claims, 16 Drawing Sheets

WIRELESS COMMUNICATION SYSTEM AND METHOD OF MAKING WIRELESS COMMUNICATION

BACKGROUND OF THE INVENTION

1. Field of the Invention

The invention relates to a wireless communication system such as a local area network, and more particularly to a wireless communication including a radio-signal base station with which a mobile wireless terminal such as a portable computer or a cellular phone makes communication with reduced power consumption.

The invention relates further to a method of making wireless communication between a radio-signal base station and a mobile wireless system, and to a mobile wireless terminal used in the above-mentioned wireless communication system.

2. Description of the Related Art

With development of wireless communication technology, a mobile wireless terminal such as a cellular phone, a personal handy-phone system (PHS), a personal digital assistant (PDA) or a handy-sized computer is widely used. Such a mobile wireless terminal is designed to make connection with Internet through an access point without communication cables, and transmit data to and receive data from other data-processing devices through a communication network such as a local area network (LAN), a wide area network (WAN) or a personal area network (PAN).

Recently, wireless LAN communication equipment called a hot spot is equipped in public spaces such as stations or cafes. Hence, a person having a mobile wireless terminal can watch homepages and/or transmit and receive e-mails through Internet by dropping in such hot spots.

A company can reduce costs for re-construction of communication cables by adopting such wireless communication system as mentioned above, even if the company relocates. Furthermore, the above-mentioned wireless communication system provides an advantage that communication with a person who often moves can be readily made without direct connection of his/her terminal with a fixed cable.

In the above-mentioned wireless communication system, since a mobile wireless terminal makes wireless communication with a radio-signal base station acting as an access point, it is necessary for a mobile wireless terminal not to be directly connected to a power-feeding line. That is, a mobile wireless terminal is necessary to be driven by a battery. As exceptional cases, a mobile wireless terminal is connected directly a power-feeding line through an adapter, only when a mobile wireless terminal is not in use. Hence, many attempts have been made to reduce power consumption of a mobile wireless terminal for ensuring long-time use, or for reducing a weight of a battery.

For instance, Japanese Patent Application Publication No. 2002-208887 has suggested a cellular phone which reduces power consumption while it is out of a communication area. If a cellular phone is out of a communication area, a user cannot make communication with other cellular phones through his/her cellular phone, and an available channel is not ensured. Hence, his/her cellular phone carries out channel-scanning for searching an available channel, resulting in much power-consumption of a battery. Hence, the suggested cellular phone is designed to temporarily cut off a power when the cellular phone is out of a communication area for a predetermined period of time, preventing power consumption while the cellular phone cannot make communication with other phones.

Attempts have been made to reduce power consumption by partially varying functions of a circuitry of a mobile wireless terminal under predetermined conditions. For instance, Japanese Patent Application Publication No. 2000-278165 has suggested a method of reducing power consumption in a CDMA (Code Division Multiple Access) type cellular phone. In the suggested method, the number of bits in A/D conversion in a mode of waiting for a call is set smaller than the same while communication is being made, reducing power consumption in A/D conversion. This ensures reduction in power consumption in a mode of waiting for a call.

Japanese Patent Application Publication No. 2002-118874 has suggested a mobile wireless terminal including a radio-signal transceiver which is turned off while the mobile wireless terminal is in a stand-by mode, to thereby reduce power consumption.

FIG. 1 is a flow-chart showing steps carried out in the suggested mobile wireless terminal.

While the mobile wireless terminal is in a stand-by mode, a user actuates a predetermined key for starting on-off control, in step S101.

Then, the mobile wireless terminal checks whether the radio-signal transceiver is in operation or not, in step S102.

If the mobile wireless terminal is in operation (YES in step S102), the mobile wireless terminal checks whether a user carried out a step for stopping operation of the radio-signal transceiver, in step S103.

If a user carried out the step (YES in step S103), the mobile wireless terminal informs a network that operation of the radio-signal transceiver is stopped, in step S104. Then, the mobile wireless terminal stops operation of the radio-signal transceiver, in step S105. Then, the mobile wireless terminal returns to a stand-by mode.

If a user did not carry out the step (NO in step S103), the mobile wireless terminal returns to a stand-by mode without stopping operation of the radio-signal transceiver.

If the mobile wireless terminal is not in operation (NO in step S102), it is checked whether a user carries out steps for operation of the radio-signal transceiver, in step S106.

If a user carries out the steps (YES in step S106), the radio-signal transceiver starts its operation, in step S107. Then, the mobile wireless terminal informs a network that the radio-signal transceiver starts its operation, in step S108. Then, the mobile wireless terminal returns to a stand-by mode.

If a user does not carry out the steps (NO in step S106), the mobile wireless terminal returns to a stand-by mode.

The mobile wireless terminal suggested in Japanese Patent Application Publication No. 2002-118874 is accompanied with problems that a user has to carry out some steps, and a user may wrongly carry out steps, because the radio-signal transceiver is turned on or off manually by a user.

Hence, there has been suggested a mobile wireless terminal which automatically turns on or off a radio-signal transceiver.

For instance, Japanese Patent Application Publication No. 7-131404 has suggested a mobile wireless terminal into which a first time zone in which calls are expected to receive and a second time zone in which calls are not expected to receive, such as night, are stored in advance. In the first time zone, receipt-timing signals are transmitted at a shorter interval for rapidly detecting receipt of signals. In the second time zone, receipt-timing signals are transmitted at a longer interval for reducing power consumption in a battery.

However, the first time zone is generally much longer than the second time zone. Hence, though power consumption in a battery is reduced in the second time zone, power consumption is not reduced at all in the first time zone longer than the second time zone. Totally, power consumption is not so reduced.

Apart from the above-mentioned suggestions, there has been suggested a wireless communication system for the purpose of reduction in power consumption. The wireless communication system is called wireless LAN system, in which mobile wireless terminals are designed to selectively operate in a power-saving mode for reducing power-consumption and a normal mode. When each of the mobile wireless terminals transfers to a power-saving mode from a normal mode, each of the mobile wireless terminals informs a radio-signal base station of such mode-transfer.

FIG. 2 is a time-chart of the above-mentioned wireless communication system. FIG. 2-(A) illustrates signals transmitted from a radio-signal base station, FIG. 2-(B) illustrates signals received in a first mobile wireless terminal which is in a normal mode, FIG. 2-(C) illustrates signals received in a second mobile wireless terminal which is in a power-saving mode, and FIG. 2-(D) illustrates signals received in a third mobile wireless terminal which is in a power-saving mode.

As illustrated in FIG. 2-(A), a radio-signal base station transmits an informative signal 121 or a beacon at a predetermined interval. An informative signal 121A to which a transmission-traffic displaying message is attached is transmitted from a radio-signal base station at an interval defined as M×T wherein T indicates an interval at which the informative signals 121 are transmitted, and M indicates a positive integer equal to or greater than two (2). Immediately after transmission of the informative signal 121A, a multiple-address packet (multi-cast or broadcast) 122 is transmitted from a radio-signal base station. Hereinbelow, an interval at which the informative signals 121A are transmitted is called "DTIM interval".

In FIG. 2, DTIM interval is illustrated as 3T as an example. The multiple-address packet informs the first to third mobile wireless terminals of information for settling physical addresses of them.

Each of the first to third mobile wireless terminals is designed to be able to select a normal mode in which power is not saved and a power-saving mode in which power consumption is reduced. As illustrated in FIG. 2-(B), the first mobile wireless terminal which is in a normal mode is in active condition 123 in which the first mobile wireless terminal can receive packets from a radio-signal base station in all of time zones. In contrast, as illustrated in FIG. 2-(C), the second mobile wireless terminal which is in a power-saving mode detects the interval T included in the informative signal transmitted from a radio-signal base station, and puts a circuit for making communication into active condition 124 at the interval T in synchronization with the informative signals 121.

The third mobile wireless terminal is designed to reduce power consumption to a greater degree than the second mobile wireless terminal. As illustrated in FIG. 2-(D), the third mobile wireless terminal is periodically put into active condition 125 in which the third mobile wireless terminal can receive packets from a radio-signal base station, at time zones for receiving the informative signals 121A and the subsequently transmitted multiple-address packets 122.

By lengthening an interval at which the third mobile wireless terminal is put into the active condition 125, it would be possible to lengthen a pause time in which power consumption can be reduced.

For instance, it is assumed that no packet signals 128 are transmitted to a certain mobile wireless terminal at a certain time zone. In such a time zone, even if the mobile wireless terminal is put into the active condition 124 at an interval at which the informative signals 121 are received, the mobile wireless terminal is never informed of receipt of the packet signals 128 by the informative signals 121. This results in repetition in receipt of the informative signals 121 in vain. Hence, in a time zone in which no traffic exists, the third mobile wireless terminal is designed to receive the informative signals 121 only at a minimum time zone in which the multiple-address packets 122 are transmitted to all of the mobile wireless terminals in multiple-address communication.

Hereinbelow is explained how packets are received with reference to the first mobile wireless terminal which is in a normal mode (see FIG. 2-(B)) and the second mobile wireless terminal which is in a power-saving mode (see FIG. 2-(C)).

It is now assumed that packets signals 128 addressed to a certain mobile wireless terminal are transmitted to a radio-signal base station at time t1 from a server (not illustrated) connected to LAN.

A radio-base signal station checks whether the mobile wireless terminal to which the packet signals 128 are addressed is in a normal mode or in a power-saving mode. If the mobile wireless terminal is in a normal mode (see FIG. 2-(B)), the radio-signal base station starts transmitting the packet signals 126 to the mobile wireless terminal at time t1.

In contrast, if the packet signals 128 are addressed to the second mobile wireless terminal (see FIG. 2-(C)), since the mobile wireless terminal is in a power-saving mode, the packet signals 128 cannot be received by the mobile wireless terminal, even if a radio-signal base station transmits the packet signals 128 at time t1 to the second mobile wireless terminal. Hence, a radio-signal base station stores the packet signals 128 into a memory equipped in the radio-signal base station. Then, a radio-signal base station combines information indicating that the packet signals 128 addressed to the second mobile wireless terminal are temporarily stored, to the informative signal 121 to be transmitted at time t2, and transmits the informative signal 121 to the second mobile wireless terminal, as shown with an arrow 131.

At time t2, the second mobile wireless terminal is in the active condition 124. Hence, the second mobile wireless terminal can receive the informative signal 121, and becomes aware that the packet signals 128 addressed to the second mobile wireless terminal are stored in a radio-signal base station, by analyzing the received informative signal 121.

Then, the second mobile wireless terminal transmits a request 132 to a radio-signal base station to transmit the packet signals 128 to the second mobile wireless terminal. On receipt of the request 132, a radio-signal base station transmits the packet signals 128 as data packets 133 to the second mobile wireless terminal at time t3.

The second mobile wireless terminal is in a condition for waiting for the packet signals 128 to be transmitted from a radio-signal base station. Hence, though not illustrated, the second mobile wireless terminal is kept in the active condition for receiving the packet signals 128, after transmission of the request 132.

As explained above, comparing the first mobile wireless terminal being in a normal mode to the second mobile wireless terminal being in a power-saving mode, there is time delay in a time at which data packet starts being transmitted. Specifically, such time delay is equal to a time difference between time t1 and time t3. Accordingly, the conventional wireless communication system illustrated in FIG. 2 is accompanied with problems that when real-time communication packets such as voices and images are transmitted to a radio-signal base station, time delay is caused, and a break is caused in packet transmission, resulting in that reproducibility of data is degraded.

The third mobile wireless terminal (FIG. 2-(D)) pauses in a longer time than the second mobile wireless terminal, though it is dependent on a timing at which the packet signals addressed to the third mobile wireless terminal arrive at a radio-signal base station. Hence, the third mobile wireless terminal may receive the informative signal 121 indicating that the packet signals addressed to the third mobile wireless terminal are stored in a radio-signal base station, later than the second mobile wireless terminal. This results in an increase in the above-mentioned time delay in comparison with the second mobile wireless terminal. Accordingly, reproducibility of data to be reproduced at real-time is further degraded.

A radio-signal base station has to store therein packet signals addressed to the second and third mobile wireless terminals, by a period of time equal to the above-mentioned time delay. Hence, as the time delay becomes longer, a radio-signal base station has to have a memory having a greater capacity for storing packet signals therein.

Japanese Patent Application Publication No. 2001-186567 has suggested a mobile communication system in which a control station detects calling traffic in each of calling sections, and determines the variable number K of repetition of transmission of a calling signal in accordance with the detected calling traffic. The control station informs mobile stations of the number K, and transmits calling signals K times over K frames. The mobile stations intermittently receive the calling signals every K frames.

Japanese Patent Application Publication No. 11-136741 has suggested a wireless data-communication system in which a master device is informed that a radio-signal base station controlling a wireless slave station receives data on behalf of the wireless slave station.

Japanese Patent Application Publication No. 2002-164835 has suggested a mobile terminal including a selector for turning a stand-by mode on or off, a processor for dealing with actions other than transmission and receipt of signals when the stand-by mode is turned off through the selector, and a second processor for turning the stand-by mode on when a user is going to transmit signals, and turning the stand-by mode off after signal transmission has been carried out.

Japanese Patent Application Publication No. 9-275587 has suggested a mobile wireless terminal including a timer. While the timer is in operation, power is not supplied to a receiver, and after the timer stops its operation, power is supplied to the receiver. Thus, the mobile wireless terminal intermittently receives data out of a service area. A time at which the timer starts or stops its operation can be determined by a user.

Japanese Patent Application Publication No. 8-172387 has suggested a mobile wireless terminal which is capable of varying a timing at which signals transmitted from a base station are received such that a signal receiver of the mobile wireless terminal is kept on for a long time when the mobile wireless terminal is in a service area, and for a short time when the mobile wireless terminal is out of a service area.

Japanese Patent Application Publication No. 63-296419 has suggested a wireless communication system in which a base station periodically transmits an informative signal to a mobile wireless terminal. While the mobile wireless terminal is in a stand-by mode in which the mobile wireless terminal intermittently receives signals from the base station at an interval, if the mobile wireless terminal does not receive signals other than the informative signals for a certain period of time, the mobile wireless terminal lengthens the interval.

Japanese Patent Application Publication No. 6-140984 has suggested a mobile wireless terminal which shortens a period of time in which a battery-saving mode is off, when the mobile wireless terminal does not receive signals from a base station, and turns a battery-saving mode on while the mobile wireless terminal is receiving signals from a base station.

SUMMARY OF THE INVENTION

In view of the above-mentioned problems in the conventional wireless communication system, it is an object of the present invention to provide a wireless communication system which enables a mobile wireless terminal being in a power-saving mode to receive real-time communication packets at real time.

In one aspect of the present invention, there is provided a wireless communication system including a radio-signal base station, and at least one mobile wireless terminal which operates in a power-saving mode in which the mobile wireless terminal intermittently receives packet signals, and in a normal mode in which the mobile wireless terminal regularly receives packet signals, wherein when the radio-signal base station receives packet signals addressed to a mobile wireless terminal being in the power-saving mode, the radio-signal base station temporarily stores the received packet signals until the mobile wireless terminal requests the radio-signal base station to transmit the packet signals thereto, and the mobile wireless terminal requests the radio-signal base station to transmit the packet signals thereto, receives a part of the packet signal from the radio-signal base station, and, if the mobile wireless terminal judges that it would be necessary to carry out real-time communication for receiving entirety of the packet signals, the mobile wireless terminal transfers to the normal mode from the power-saving mode for receiving entirety of the packet signals.

In the wireless communication system, the radio-signal base station knows which mobile wireless terminal is in a power-saving mode. When the radio-signal base station receives packet signals addressed to a mobile wireless terminal being in a power-saving mode, the radio-signal base station temporarily stores the received packet signals until the addressed mobile wireless terminal requests the radio-signal base station to transmit the packet signals thereto. The radio-signal base station periodically transmits an informative signal to the mobile wireless terminal. The mobile wireless terminal which is in a power-saving mode is aware that the packet signals addressed to the mobile wireless terminal are temporarily stored in the radio-signal base station, by analyzing the received informative signal. If the packet signals addressed to the mobile wireless terminal are temporarily stored in the radio-signal base station, the mobile wireless terminal requests the radio-signal base station to transmit the packet signals thereto. On receipt of the packet signals, the mobile wireless terminal judges whether it is necessary to receive the packet signals at real-time communication, based on a protocol thereof. If the mobile wireless terminal judges that it is necessary to carry out real-time communication for receiving entirety of the packet signals, the mobile wireless terminal transfers to the normal mode from the power-saving mode, and informs the radio-signal base station of such mode transfer.

In accordance with the wireless communication system, when the mobile wireless terminal receives the packet signals temporarily stored in the radio-signal base station, the mobile wireless terminal judges whether the mobile wireless terminal is kept in a power-saving mode. Hence, the mobile wireless terminal can determine an interval at which the mobile wireless terminal receives the informative signal from the radio-signal base station. This ensures reduction in power consumption. In addition, when the mobile wireless terminal judges that it is not necessary to carry out real-time communication for receiving the packet signals, the mobile wireless terminal may intermittently receive the packet signals at an interval at which the informative signal is transmitted to the mobile wireless terminal from the radio-signal base station, ensuring that power-saving condition is maintained.

The mobile wireless terminal may transfer to the power-saving mode when entirety of the packet signals has been received.

The radio-signal base station may periodically transmit an informative signal to the mobile wireless terminal being in the power-saving mode, and the mobile wireless terminal is aware that packet signals addressed to the mobile wireless terminal are stored in the radio-signal base station, by analyzing the received informative signal.

The mobile wireless terminal may receive the informative signal in the power-saving mode at an interval determined by itself.

It is preferable that if the mobile wireless terminal judges that it would not be necessary to carry out real-time communication for receiving entirety of the packet signals, the mobile wireless terminal intermittently receives the packet signals at a certain interval in the power-saving mode.

For instance, the mobile wireless terminal may receive the packet signals at an interval at which the mobile wireless terminal receives the informative signal from the radio-signal base station.

It is preferable that the mobile wireless terminal receives the packet signals at an interval equal to N×I, wherein the I indicates an interval at which the mobile wireless terminal receives the informative signal from the radio-signal base station, and the N is a positive integer equal to or greater than two (2).

It is preferable that the mobile wireless terminal sets a longer interval at which the mobile wireless terminal receives the packet signals, for a smaller frequency at which the packet signals are transmitted from the radio-signal base station.

By setting a longer interval at which the mobile wireless terminal receives the packet signals as the packet signals are transmitted from the radio-signal base station at a smaller frequency, it would be possible to save power.

It is preferable that the mobile wireless terminal sets a longer interval at which the mobile wireless terminal receives the packet signals, if the mobile wireless terminal cannot receive the informative signal from the radio-signal base station.

For instance, when the mobile wireless terminal is out of a service area, an interval at which the mobile wireless terminal receives the packet signals is set longer, ensuring reduction in power consumption.

It is preferable that the mobile wireless terminal checks whether the received packet signals include data indicative of commencement of real-time communication, and if the received packet signals include such data, the mobile wireless terminal judges the packet signal to be received in real-time communication.

The mobile wireless terminal may be designed to judge whether real-time communication should be carried out for receiving the packet signals, when the mobile wireless terminal receives a part of the packet signals as initial data. Hence, the mobile wireless terminal can make preparation for real-time communication prior to actually carrying out real-time communication.

It is preferable that the mobile wireless terminal checks whether the received packet signals include real-time transmission protocol, and if the received packet signals include the real-time transmission protocol, the mobile wireless terminal judges the packet signal to be received in real-time communication.

It is preferable that the mobile wireless terminal is comprised of a cellular phone.

For instance, the radio-signal base station preferably includes functions of transmitting packet signals for real-time communication to a communication network after certain protocol communication, memorizing a mobile wireless terminal(s) which is(are) in the power-saving mode, among a plurality of mobile wireless terminals, periodically transmitting an informative signal to the mobile wireless terminal which is in the power-saving mode, temporarily storing packet signals addressed to the mobile wireless terminal which is in the power-saving mode, when the radio-signal base station stores packet signals addressed to the mobile wireless terminal which is in the power-saving mode, combining information indicating so to the informative signal, and on receipt of a request from the mobile wireless terminal to transmit the packet signals stored therein, to the mobile wireless terminal, transmitting the packet signals intermittently to a mobile wireless terminal which is in the power-saving mode, but regularly to the mobile wireless terminal, if the mobile wireless terminal is transferred to the normal mode.

For instance, the mobile wireless terminal preferably includes functions of when the mobile wireless terminal transfers to the power-saving mode from the normal mode, informing the radio-signal base station of such mode-transfer, determining an interval at which the mobile wireless terminal receives signals, the interval being equal to N×I wherein N is a positive integer equal to or greater than two (2), and I indicates an interval at which the radio-signal base station transmits the announce signal, receiving the informative signal from the radio-signal base station at the interval when the mobile wireless terminal is in the power-saving mode, if the received informative signal includes information indicating that the radio-signal base station stores packet signals addressed to the mobile wireless terminal, requesting the radio-signal base station to transmit the packet signals to the mobile wireless terminal, judging whether the packet signals are necessary to be received in real-time communication, based on a protocol of the received packet signals, when the packet signals are judged to be necessary to be received in real-time communication, transferring to the normal mode from the power-saving mode, and informing the radio-signal base station of such mode-transfer, and transferring to the power-saving mode from the normal mode when the packet signals have been all transmitted to the mobile wireless terminal.

There is further provided a wireless communication system including a radio-signal base station, and at least one mobile wireless terminal which operates in a power-saving mode in which the mobile wireless terminal intermittently receives packet signals, and in a normal mode in which the mobile wireless terminal regularly receives packet signals, wherein when the radio-signal base station receives packet signals addressed to a mobile wireless terminal being in the power-saving mode, the radio-signal base station temporarily stores the received packet signals until the mobile wireless terminal requests the radio-signal base station to transmit the packet signals thereto, and the mobile wireless terminal requests the radio-signal base station to transmit the packet signals thereto and transfers to the normal mode from the power-saving mode, if the mobile wireless terminal judges that the received packet signals are packet signals to be received in real-time communication, the mobile wireless terminal receives entirety of the packet signals in the normal mode, and the mobile wireless terminal transfers to the power-saving mode when the packet signals have been all received in real-time communication.

In the earlier mentioned aspect of the invention, the mobile wireless terminal transfers into a normal mode from a power-saving mode after the mobile wireless terminal has confirmed that packet signals should be received at real-time communication. In contrast, in the present aspect of the invention, the mobile wireless terminal transfers into a normal mode from a power-saving mode just when the mobile wireless terminal transmits a request to the radio-signal base station to transmit the packet signals to the mobile wireless terminal. The mobile wireless terminal analyzes the received packet signals. If the received packet signals are packets which should be received at real-time communication, the mobile wireless terminal keeps being in a normal mode. After completion of the real-time communication, the mobile wireless terminal informs the radio-signal base station that the mobile wireless terminal transfers into a power-saving mode from a normal mode. In contrast, if the received packet signals are packets which are not necessary to be received at real-time communication, the mobile wireless terminal transfers into a power-saving mode from a normal mode, and informs the radio-signal base station that the mobile wireless terminal transferred to a power-saving mode. Thus, it would be possible to rapidly start real-time communication, and the radio-signal base station is not necessary to include a memory having a big capacity for storing the packet signals.

It is preferable that if the mobile wireless terminal judges that the received packet signals are packet signal not necessary to be received in real-time communication, the mobile wireless terminal transfers to the power-saving mode from the normal mode.

It is preferable that the mobile wireless terminal transfers to the power-saving mode when entirety of the packet signals has been received.

It is preferable that the radio-signal base station periodically transmits an informative signal to the mobile wireless terminal being in the power-saving mode, and the mobile wireless terminal is aware that packet signals addressed to the mobile wireless terminal are stored in the radio-signal base station, by analyzing the received informative signal.

It is preferable that the mobile wireless terminal receives the informative signal in the power-saving mode at an interval determined by itself.

It is preferable that if the mobile wireless terminal judges that it would not be necessary to carry out real-time communication for receiving entirety of the packet signals, the mobile wireless terminal intermittently receives the packet signals at a certain interval in the power-saving mode.

It is preferable that the mobile wireless terminal receives the packet signals at an interval at which the mobile wireless terminal receives the informative signal from the radio-signal base station.

It is preferable that the mobile wireless terminal receives the packet signals at an interval equal to N×I, wherein the I indicates an interval at which the mobile wireless terminal receives the informative signal from the radio-signal base station, and the N is a positive integer equal to or greater than two (2).

It is preferable that the mobile wireless terminal sets a longer interval at which the mobile wireless terminal receives the packet signals, for a smaller frequency at which the packet signals are transmitted from the radio-signal base station.

It is preferable that the mobile wireless terminal sets a longer interval at which the mobile wireless terminal receives the packet signals, if the mobile wireless terminal cannot receive the announcement from the radio-signal base station.

It is preferable that the mobile wireless terminal checks whether the received packet signals include data indicative of commencement of real-time communication, and if the received packet signals include such data, the mobile wireless terminal judges the packet signal to be received in real-time communication.

It is preferable that the mobile wireless terminal checks whether the received packet signals include real-time transmission protocol, and if the received packet signals include the real-time transmission protocol, the mobile wireless terminal judges the packet signal to be received in real-time communication.

For instance, the mobile wireless terminal may be comprised of a cellular phone.

For instance, the radio-signal base station may include functions of transmitting packet signals for real-time communication to a communication network after certain protocol communication, memorizing a mobile wireless terminal(s) which is(are) in the power-saving mode, among a plurality of mobile wireless terminals, periodically transmitting an informative signal to the mobile wireless terminal which is in the power-saving mode, temporarily storing packet signals addressed to the mobile wireless terminal which is in the power-saving mode, when the radio-signal base station stores packet signals addressed to the mobile wireless terminal which is in the power-saving mode, combining information indicating so to the informative signal, and on receipt of a request from the mobile wireless terminal to transmit the packet signals stored therein, to the mobile wireless terminal, transmitting the packet signals intermittently to a mobile wireless terminal which is in the power-saving mode, but regularly to the mobile wireless terminal, if the mobile wireless terminal is transferred to the normal mode.

For instance, the mobile wireless terminal may include functions of when the mobile wireless terminal transfers to the power-saving mode from the normal mode, informing the radio-signal base station of such mode-transfer, determining an interval at which the mobile wireless terminal receives signals, the interval being equal to N×I wherein N is a positive integer equal to or greater than two (2), and I indicates an interval at which the radio-signal base station transmits the announce signal, receiving the informative signal from the radio-signal base station at the interval when the mobile wireless terminal is in the power-saving mode, if the received informative signal includes information indicating that the radio-signal base station stores packet signals addressed to the mobile wireless terminal, requesting the radio-signal base station to transmit the packet signals to the mobile wireless terminal, judging whether the packet signals are necessary to be received in real-time communication, based on a protocol of the received packet signals, requesting the radio-signal base station to transmit all of the packet signals to the mobile wireless terminal, and transferring to the normal mode from the power-saving mode, transferring to the power-saving mode from the normal mode when the packet signals have been all transmitted to the mobile wireless terminal.

In another aspect of the present invention, there is provided a method of making wireless communication system between a radio-signal base station and at least one mobile wireless terminal which operates in a power-saving mode in which the mobile wireless terminal intermittently receives packet signals, and in a normal mode in which the mobile wireless terminal regularly receives packet signals, the method including the steps of (a) receiving packet signals addressed to a mobile wireless terminal being in the power-saving mode, (b) temporarily storing the received packet signals until the mobile wireless terminal requests the radio-signal base station to transmit the packet signals thereto, (c) requesting the radio-signal base station to transmit the packet signals thereto, (d) receiving a part of the packet signal from the radio-signal base station, and (e) if the mobile wireless terminal judges that it would be necessary to carry out real-time communication for receiving entirety of the packet signals, transferring to the normal mode from the power-saving mode for receiving entirety of the packet signals, the steps (a) and (b) being carried out by the radio-signal base station, and the steps (c) to (e) being carried out by the mobile wireless terminal.

The method may further include the step of transferring to the power-saving mode when entirety of the packet signals has been received, the step being carried out by the mobile wireless terminal.

The method may further include the step of periodically transmitting an informative signal to the mobile wireless terminal being in the power-saving mode such that the mobile wireless terminal is aware that packet signals addressed to the mobile wireless terminal are stored in the radio-signal base station, by analyzing the received informative signal, the step being carried out by the radio-signal base station.

The method may further include the step of receiving the informative signal in the power-saving mode at an interval determined by itself, the step being carried out by the mobile wireless terminal.

The method may further include the step of, if the mobile wireless terminal judges that it would not be necessary to carry out real-time communication for receiving entirety of the packet signals, intermittently receiving the packet signals at a certain interval in the power-saving mode, the step being carried out by the mobile wireless terminal.

The method may further include the step of receiving the packet signals at an interval at which the mobile wireless terminal receives the informative signal from the radio-signal base station, the step being carried out by the mobile wireless terminal.

The method may further include the step of receiving the packet signals at an interval equal to N×I, wherein the I indicates an interval at which the mobile wireless terminal receives the informative signal from the radio-signal base station, and the N is a positive integer equal to or greater than two (2), the step being carried out by the mobile wireless terminal.

The method may further include the step of setting a longer interval at which the mobile wireless terminal receives the packet signals, for a smaller frequency at which the packet signals are transmitted from the radio-signal base station, the step being carried out by the mobile wireless terminal.

The method may further include the step of setting a longer interval at which the mobile wireless terminal receives the packet signals, if the mobile wireless terminal cannot receive the informative signal from the radio-signal base station, the step being carried out by the mobile wireless terminal.

The method may further include the steps of checking whether the received packet signals include data indicative of commencement of real-time communication, and, if the received packet signals include such data, judging the packet signal to be received in real-time communication, the steps being carried out by the mobile wireless terminal.

The method may further include the steps of checking whether the received packet signals include real-time transmission protocol, and, if the received packet signals include the real-time transmission protocol, judging the packet signal to be received in real-time communication, the step being carried out by the mobile wireless terminal.

There is further provided a method of making wireless communication system between a radio-signal base station and at least one mobile wireless terminal which operates in a power-saving mode in which the mobile wireless terminal intermittently receives packet signals, and in a normal mode in which the mobile wireless terminal regularly receives packet signals, the method including the steps of (a) receiving packet signals addressed to a mobile wireless terminal being in the power-saving mode, (b) temporarily storing the received packet signals until the mobile wireless terminal requests the radio-signal base station to transmit the packet signals thereto, (c) requesting the radio-signal base station to transmit the packet signals thereto, (d) transferring to the normal mode from the power-saving mode, (e) if the mobile wireless terminal judges that the received packet signals are packet signals to be received in real-time communication, receiving entirety of the packet signals in the normal mode, and (f) transferring to the power-saving mode when the packet signals have been all received in real-time communication, the steps (a) and (b) being carried out by the radio-signal base station, and the steps (c) to (f) being carried out by the mobile wireless terminal.

The method may further include the step of, if the mobile wireless terminal judges that the received packet signals are packet signal not necessary to be received in real-time communication, transferring to the power-saving mode from the normal mode, the step being carried out by the mobile wireless terminal.

The method may further include the step of transferring to the power-saving mode when entirety of the packet signals has been received, the step being carried out by the mobile wireless terminal.

The method may further include the step of periodically transmitting an informative signal to the mobile wireless terminal being in the power-saving mode such that the mobile wireless terminal is aware that packet signals addressed to the mobile wireless terminal are stored in the radio-signal base station, by analyzing the received informative signal, the step being carried out by the radio-signal base station.

The method may further include the step of receiving the informative signal in the power-saving mode at an interval determined by itself, the step being carried out by the mobile wireless terminal.

The method may further include the step of, if the mobile wireless terminal judges that it would not be necessary to carry out real-time communication for receiving entirety of the packet signals, intermittently receiving the packet signals at a certain interval in the power-saving mode, the step being carried out by the mobile wireless terminal.

The method may further include the step of receiving the packet signals at an interval at which the mobile wireless terminal receives the informative signal from the radio-signal base station, the step being carried out by the mobile wireless terminal.

The method may further include the step of receiving the packet signals at an interval equal to N×I, wherein the I indicates an interval at which the mobile wireless terminal receives the informative signal from the radio-signal base station, and the N is a positive integer equal to or greater than two (2), the step being carried out by the mobile wireless terminal.

The method may further include the step of setting a longer interval at which the mobile wireless terminal receives the packet signals, for a smaller frequency at which the packet signals are transmitted from the radio-signal base station, the step being carried out by the mobile wireless terminal.

The method may further include the step of setting a longer interval at which the mobile wireless terminal receives the packet signals, if the mobile wireless terminal cannot receive the informative signal from the radio-signal base station, the step being carried out by the mobile wireless terminal.

The method may further include the steps of checking whether the received packet signals include data indicative of commencement of real-time communication, and, if the received packet signals include such data, judging the packet signal to be received in real-time communication, the steps being carried out by the mobile wireless terminal.

The method may further include the steps of checking whether the received packet signals include real-time transmission protocol, and, if the received packet signals include the real-time transmission protocol, judging the packet signal to be received in real-time communication, the step being carried out by the mobile wireless terminal.

In still another aspect of the present invention, there is provided a mobile wireless terminal used in combination with a radio-signal base station in a wireless communication system, the radio-signal base station, when the radio-signal base station receives packet signals addressed to a mobile wireless terminal being in a power-saving mode, temporarily storing the received packet signals until the mobile wireless terminal requests the radio-signal base station to transmit the packet signals thereto, wherein the mobile wireless terminal operates in a power-saving mode in which the mobile wireless terminal intermittently receives packet signals, and in a normal mode in which the mobile wireless terminal regularly receives packet signals, the mobile wireless terminal requests the radio-signal base station to transmit the packet signals thereto, receives a part of the packet signal from the radio-signal base station, and, if the mobile wireless terminal judges that it would be necessary to carry out real-time communication for receiving entirety of the packet signals, transfers to the normal mode from the power-saving mode for receiving entirety of the packet signals.

It is preferable that the mobile wireless terminal transfers to the power-saving mode when entirety of the packet signals has been received.

It is preferable that the mobile wireless terminal is aware that packet signals addressed to the mobile wireless terminal are stored in the radio-signal base station, by analyzing a informative signal periodically transmitted from the radio-signal base station.

It is preferable that the mobile wireless terminal receives the informative signal in the power-saving mode at an interval determined by itself.

It is preferable that if the mobile wireless terminal judges that it would not be necessary to carry out real-time communication for receiving entirety of the packet signals, the mobile wireless terminal intermittently receives the packet signals at a certain interval in the power-saving mode.

It is preferable that the mobile wireless terminal receives the packet signals at an interval at which the mobile wireless terminal receives the informative signal from the radio-signal base station.

It is preferable that the mobile wireless terminal receives the packet signals at an interval equal to N×I, wherein the I indicates an interval at which the mobile wireless terminal receives the informative signal from the radio-signal base station, and the N is a positive integer equal to or greater than two (2).

It is preferable that the mobile wireless terminal sets a longer interval at which the mobile wireless terminal receives the packet signals, for a smaller frequency at which the packet signals are transmitted from the radio-signal base station.

It is preferable that the mobile wireless terminal sets a longer interval at which the mobile wireless terminal receives the packet signals, if the mobile wireless terminal cannot receive the informative signal from the radio-signal base station.

It is preferable that the mobile wireless terminal checks whether the received packet signals include data indicative of commencement of real-time communication, and if the received packet signals include such data, the mobile wireless terminal judges the packet signal to be received in real-time communication.

It is preferable that the mobile wireless terminal checks whether the received packet signals include real-time transmission protocol, and if the received packet signals include the real-time transmission protocol, the mobile wireless terminal judges the packet signal to be received in real-time communication.

For instance, the mobile wireless terminal may be comprised of a cellular phone.

For instance, the mobile wireless terminal may include functions of when the mobile wireless terminal transfers to the power-saving mode from the normal mode, informing the radio-signal base station of such mode-transfer, determining an interval at which the mobile wireless terminal receives signals, the interval being equal to N×I wherein N is a positive integer equal to or greater than two (2), and I indicates an interval at which the radio-signal base station transmits the announce signal, receiving the informative signal from the radio-signal base station at the interval when the mobile wireless terminal is in the power-saving mode, if the received informative signal includes information indicating that the radio-signal base station stores packet signals addressed to the mobile wireless terminal, requesting the radio-signal base station to transmit the packet signals to the mobile wireless terminal, judging whether the packet signals are necessary to be received in real-time communication, based on a protocol of the received packet signals, when the packet signals are judged to be necessary to be received in real-time communication, transferring to the normal mode from the power-saving mode, and informing the radio-signal base station of such mode-transfer, and transferring to the power-saving mode from the normal mode when the packet signals have been all transmitted to the mobile wireless terminal.

There is further provided a mobile wireless terminal used in combination with a radio-signal base station in a wireless communication system, the radio-signal base station, when the radio-signal base station receives packet signals addressed to a mobile wireless terminal being in a power-saving mode, temporarily storing the received packet signals until the mobile wireless terminal requests the radio-signal base station to transmit the packet signals thereto, wherein the mobile wireless terminal operates in a power-saving mode in which the mobile wireless terminal intermittently receives packet signals, and in a normal mode in which the mobile wireless terminal regularly receives packet signals, the mobile wireless terminal requests the radio-signal base station to transmit the packet signals thereto and transfers to the normal mode from the power-saving mode, if the mobile wireless terminal judges that the received packet signals are packet signals to be received in real-time communication, receives entirety of the packet signals in the normal mode, and transfers to the power-saving mode when the packet signals have been all received in real-time communication.

It is preferable that if the mobile wireless terminal judges that the received packet signals are packet signal not necessary to be received in real-time communication, the mobile wireless terminal transfers to the power-saving mode from the normal mode.

It is preferable that the mobile wireless terminal transfers to the power-saving mode when entirety of the packet signals has been received.

It is preferable that the mobile wireless terminal is aware that packet signals addressed to the mobile wireless terminal are stored in the radio-signal base station, by analyzing a informative signal periodically transmitted from the radio-signal base station.

It is preferable that the mobile wireless terminal receives the informative signal in the power-saving mode at an interval determined by itself It is preferable that if the mobile wireless terminal judges that it would not be necessary to carry out real-time communication for receiving entirety of the packet signals, the mobile wireless terminal intermittently receives the packet signals at a certain interval in the power-saving mode.

It is preferable that the mobile wireless terminal receives the packet signals at an interval at which the mobile wireless terminal receives the informative signal from the radio-signal base station.

It is preferable that the mobile wireless terminal receives the packet signals at an interval equal to N×I, wherein the I indicates an interval at which the mobile wireless terminal receives the informative signal from the radio-signal base station, and the N is a positive integer equal to or greater than two (2).

It is preferable that the mobile wireless terminal sets a longer interval at which the mobile wireless terminal receives the packet signals, for a smaller frequency at which the packet signals are transmitted from the radio-signal base station.

It is preferable that the mobile wireless terminal sets a longer interval at which the mobile wireless terminal receives the packet signals, if the mobile wireless terminal cannot receive the announcement from the radio-signal base station.

It is preferable that the mobile wireless terminal checks whether the received packet signals include data indicative of commencement of real-time communication, and if the received packet signals include such data, the mobile wireless terminal judges the packet signal to be received in real-time communication.

It is preferable that the mobile wireless terminal checks whether the received packet signals include real-time transmission protocol, and if the received packet signals include the real-time transmission protocol, the mobile wireless terminal judges the packet signal to be received in real-time communication.

For instance, the mobile wireless terminal may be comprised of a cellular phone.

For instance, the mobile wireless terminal may include functions of when the mobile wireless terminal transfers to the power-saving mode from the normal mode, informing the radio-signal base station of such mode-transfer, determining an interval at which the mobile wireless terminal receives signals, the interval being equal to N×I wherein N is a positive integer equal to or greater than two (2), and I indicates an interval at which the radio-signal base station transmits the announce signal, receiving the informative signal from the radio-signal base station at the interval when the mobile wireless terminal is in the power-saving mode, if the received informative signal includes information indicating that the radio-signal base station stores packet signals addressed to the mobile wireless terminal, requesting the radio-signal base station to transmit the packet signals to the mobile wireless terminal, judging whether the packet signals are necessary to be received in real-time communication, based on a protocol of the received packet signals, requesting the radio-signal base station to transmit all of the packet signals to the mobile wireless terminal, and transferring to the normal mode from the power-saving mode, transferring to the power-saving mode from the normal mode when the packet signals have been all transmitted to the mobile wireless terminal.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

First Embodiment

Figure 3:
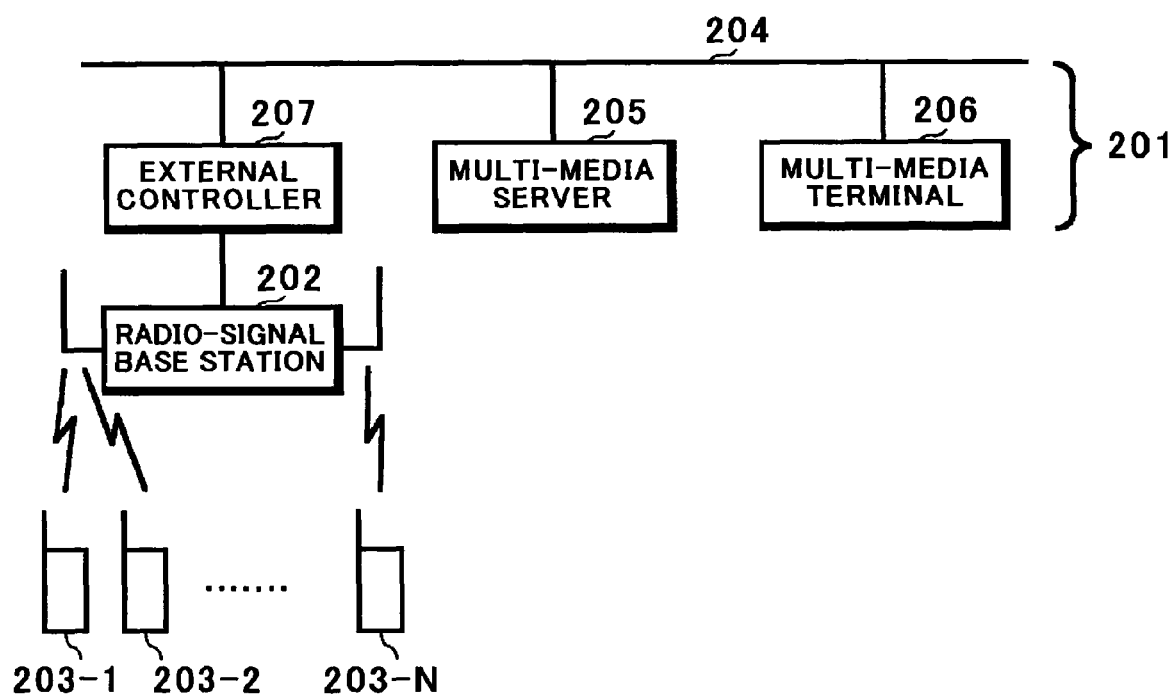
FIG. 3 is a block diagram of a wireless communication system in accordance with the first embodiment of the present invention.

FIG. 3 is a block diagram of a wireless communication system in accordance with the first embodiment of the present invention.

The wireless communication system is comprised of a wired LAN 201, a radio-signal base station 202 to which the wired LAN 201 is connected for communication, and first to N-th mobile wireless terminals 203-1 to 203-N each making communication with the radio-signal base station 202, wherein N is a positive integer equal to or greater than two (2).

The wired LAN 201 is comprised of a communication cable 204 through which packet signals are transmitted, a multi-media server 205 connected to the communication cable 204, a multi-media terminal 206 connected to the communication cable 204, and an external controller 207 connected to the communication cable 204.

The wired LAN 201 is an ordinary LAN using wires, and hence, may be connected to other servers or workstations and so on.

The multi-media terminal 206 produces and edits multi-media data such as voices and images.

The multi-media server 205 transmits multi-media data produced or edited by the multi-media terminal 206, to any one of the first to N-th mobile wireless terminals 203-1 to 203-N, and transmits multi-media data received from any one of the first to N-th mobile wireless terminals 203-1 to 203-N, to the multi-media terminal 206 or other devices through the communication cable 204. The multi-media server 205 can deal with real-time data such as multi-media data produced or edited by a device (not illustrated) other than the multi-media terminal 206.

The external controller 207 is arranged between the communication cable 204 and the radio-signal base station 202. The external controller 207 controls transmission of multiple-address packets.

The external controller 207 may be omitted, and hence, the radio-signal base station 202 may be directly connected to the communication cable 204.

In the first embodiment, in place of the wired LAN 201, other communication network such as a wired WAN may be used.

Figure 4:
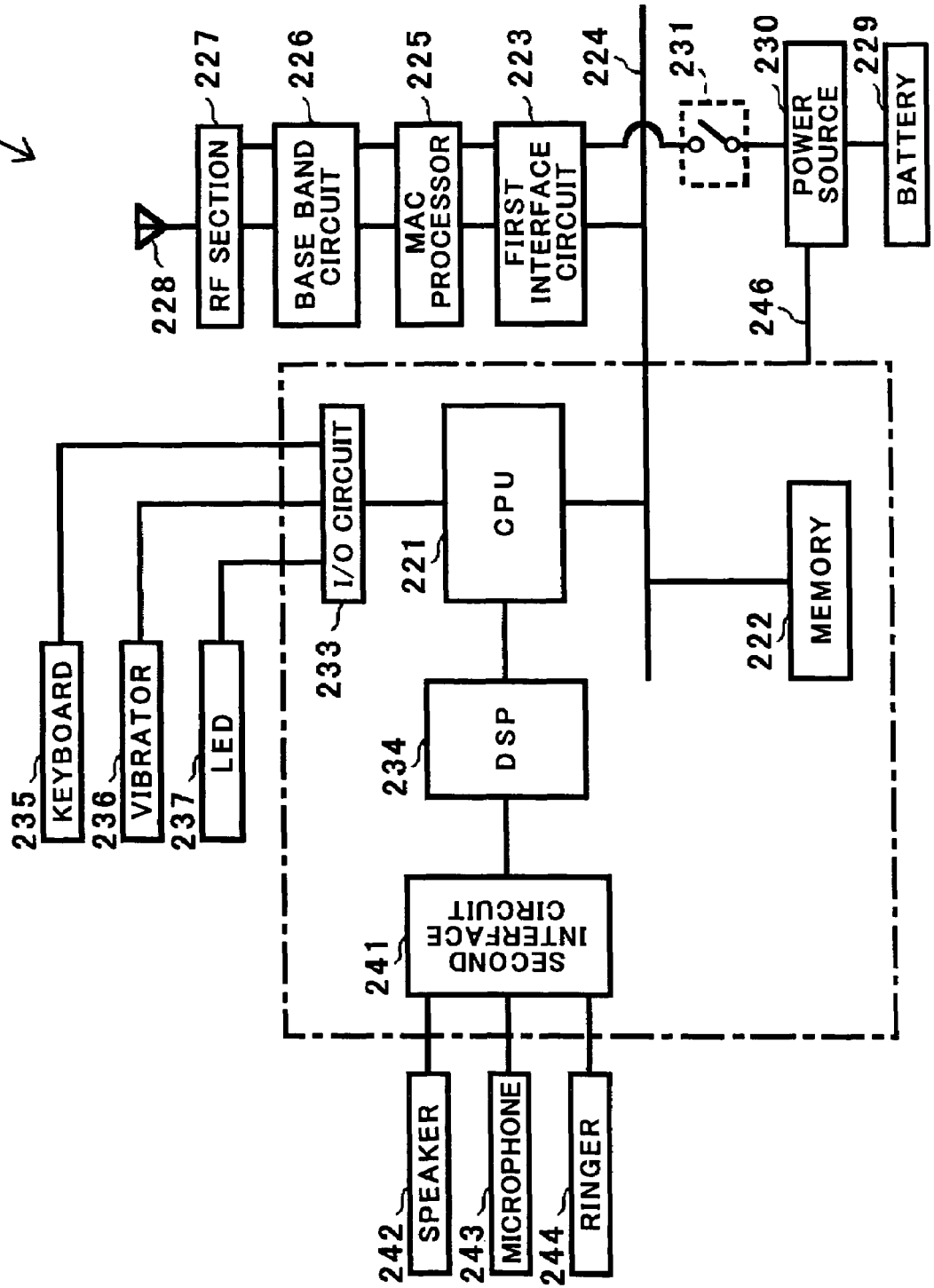
FIG. 4 is a block diagram showing a circuit structure of a first mobile wireless terminal in the first embodiment.

FIG. 4 is a block diagram showing a structure of the first mobile wireless terminal 203-1.

Each of the first to N-th mobile wireless terminals 203-1 to 203-N is comprised of a portable communication device such as a cellular phone, a personal handy-phone system (PHS), a personal digital assistant (PDA), or a note-type personal computer. Since the second to N-th mobile wireless terminals 203-2 to 203-N have the same structure as that of the first mobile wireless terminal 203-1, and hence, will not be explained.

With reference to FIG. 4, the first mobile wireless terminal 203-1 is a central processing unit (CPU) 221, a memory 222, a first interface circuit 223, a bus 224, a media access control (MAC) processor 225, a base band circuit 226, a radio frequency (RF) section 227, an antenna 228, a battery 229, a power source 230, a switching circuit 231, an input/output (I/O) circuit 233, a digital signal processor (DSP) 234, a keyboard 235, a vibrator 236, a light emitting diode (LED) 237, a second interface circuit 241, a speaker 242, a microphone 243, and a ringer 244.

The memory 222 stores a control program therein, and temporarily stores data therein. The central processing unit 221, the memory 222 and the first interface circuit 223 are electrically connected to one another through the bus 224.

The media access control processor 225 processes MAC addresses of LAN. The base band circuit 226 deals with base band signals. The media access control processor 225, the base band circuit 226 and the radio frequency section 227 are electrically connected in series to the first interface circuit 223. The radio frequency section 227 is electrically connected to the antenna 228 through which radio signals are received and transmitted. The power source 230 to which the battery 229 is electrically connected provides power to the first interface circuit 223, the media access control processor 225, the base band circuit 226 and the radio frequency section 227 under on-off control by the switching circuit 231.

The central processing unit 221 is electrically connected to the I/O circuit 233 and the digital signal processor 234. The I/O circuit 233 is electrically connected to the keyboard 235 through which a user inputs various data, the vibrator 236 making annunciation to a user by vibration, and the light emitting diode 237 for illuminating a display (not illustrated) during communication.

The digital signal processor 234 is electrically connected to the speaker 242, the microphone 243 and the ringer 244 through the second interface circuit 241. The ringer 244 is a circuit for ringing an opponent's cellular phone.

The central processing unit 221, the memory 222, the I/O circuit 233, the digital signal processor 234 and the second interface circuit 241 are directly electrically connected to the power source 230 through a line 246. Unless the power source 230 is turned off by actuating a main switch (not illustrated), power is kept supplied to them from the power source 230.

In contrast, the switching circuit 231 is usually turned off, but is turned on only when the first mobile wireless terminal 203-1 is in a power-saving mode and transmits or receives signals.

Figure 5:
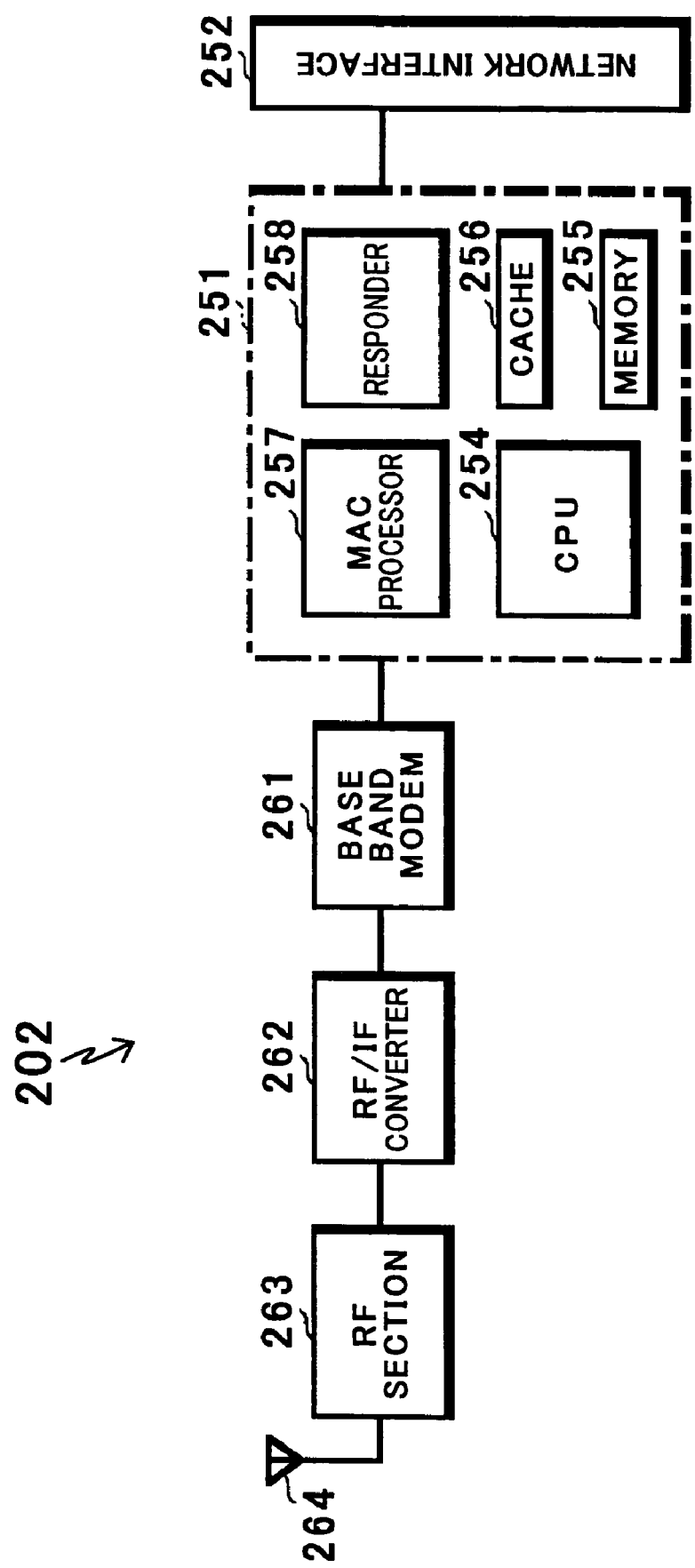
FIG. 5 is a block diagram of a radio-signal base station in the first embodiment.

FIG. 5 is a block diagram of the radio-signal base station 202.

The radio-signal base station 202 is comprised of a communication controller 251, a network interface 252 such as Ethernet, a base band modem 261, an radio frequency/intermediate frequency (RF/IF) converter 262, a radio frequency (RF) section 263, and an antenna 264.

The communication controller 251 is electrically connected to the external controller 207 (see FIG. 3) through the network interface 252, and is designed to transmit packet signals into and receive packet signals from the communication cable 204.

The communication controller 251 is comprised of a central processing unit (CPU) 254, a memory 255 storing therein a program used for controlling the central processing unit 254, a cache memory 256 temporarily storing data such as real-time data, a media access control (MAC) processor 257 for dealing with MAC addresses, and a responder 258 which, on receipt of multiple-address communication, responds to the multiple-address communication on behalf of an associated mobile wireless terminal(s) among the first to N-th mobile wireless terminals 203-1 to 203-N.

It is not always necessary to construct the media access control processor 257 and the responder 258 as actual circuitry. The media access control processor 257 and the responder 258 may be accomplished as software by the above-mentioned control program.

The communication controller 251, the base band modem 261, the RF/IF converter 262 and the RF section 263 are electrically connected in series to one another. The RF section 263 is electrically connected to the antenna 264.

Specifically, an address is applied in the communication controller 251 to packet signals transmitted from the network interface 252. The packet signals are then modulated in the base band modem 261. Thereafter, the packet signals are converted into radio-frequency signals in the RF/IF converter 262. Then, the radio-frequency signals are transmitted into air through the RF section 263 and the antenna 264, and are received at a destination among the first to N-th mobile wireless terminals 203-1 to 203-N.

Radio signals transmitted from any one of the first to N-th mobile wireless terminals 203-1 to 203-N is received at the RF section 263 through the antenna 264. The radio signals received at the RF section 263 are converted into intermediate-frequency signals in the RF/IF converter 262, and then, demodulated in the base band modem 261. After having been processed in the communication controller 251, the intermediate-frequency signals are transmitted to a destination such as the multi-media terminal 206 (see FIG. 3) through the network interface 252 and the communication cable 204.

The first mobile wireless terminal 203-1 changes its mode between a normal (active) mode and a power-saving mode. Hereinbelow is explained an operation of the first mobile wireless terminal 203-1. It should be noted that when the first mobile wireless terminal 203-1 operates in a normal mode, the operation of the first mobile wireless terminal 203-1 is identical with the operation illustrated in FIG. 2. Hence, an operation of the first mobile wireless terminal 203-1 in a normal mode is not explained.

The first mobile wireless terminal 203-1 can make communication with the multi-media server 205 and the multi-media terminal 206 both electrically connected to the communication cable 204, by using Internet protocol (IP), through the radio-signal base station 202. In addition, the first mobile wireless terminal 203-1 can act as a terminal in the wireless communication system in accordance with the first embodiment by carrying out connection negotiation through the use of a wireless physical layer.

Figure 6:
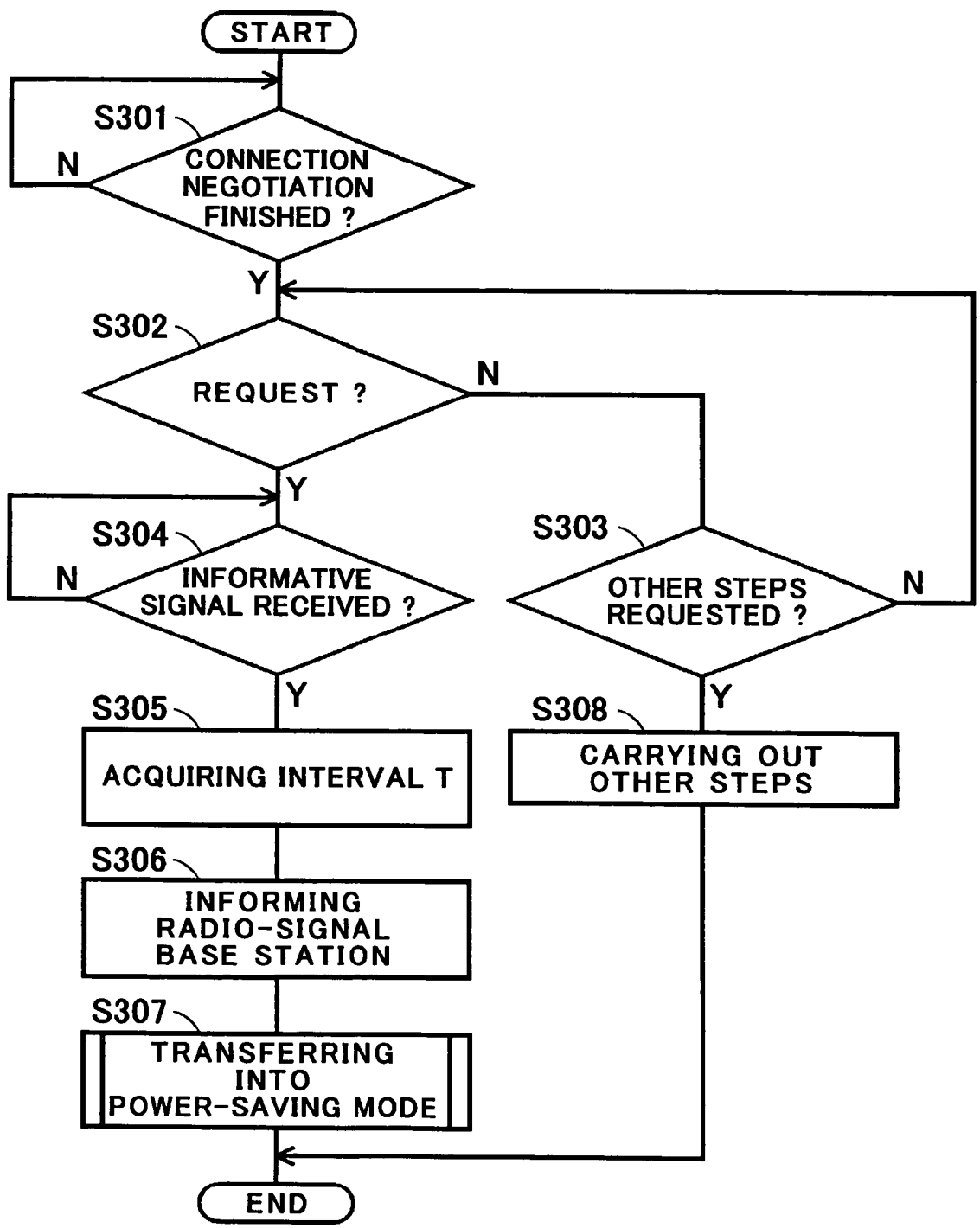
FIG. 6 is a flow-chart showing steps carried out by a first mobile wireless terminal when transferring to a power-saving mode, in the first embodiment.

FIG. 6 is a flow-chart showing steps to be carried out by the first mobile wireless terminal 203-1 when the first mobile wireless terminal 203-1 transfers into a power-saving mode.

It is assumed that the first mobile wireless terminal 203-1 finished connection negotiation for joining the wireless communication system as a terminal at a certain timing (YES in step S301).

Then, the first mobile wireless terminal 203-1 monitors whether a request of transferring into a power-saving mode is generated therein, in step S302.

If such a request is generated in the first mobile wireless terminal 203-1 (YES in step S302), the first mobile wireless terminal 203-1 waits for an informative signal 121 transmitted from the radio-signal base station 202, in step S304. On receipt of the informative signal 121 from the radio-signal base station 202 (YES in step S304), the first mobile wireless terminal 203-1 develops the received informative signal 121 to thereby acquire data indicative of an interval T at which the informative signals 121 are transmitted from the radio-signal base station 202, in step S305.

Then, the first mobile wireless terminal 203-1 informs the radio-signal base station 202 through the use of frame-control field that the first mobile wireless terminal 203-1 transfers into a power-saving mode, in step S306.

Then, the first mobile wireless terminal 203-1 transfers into a power-saving mode at a predetermined timing, in step S307.

In a power-saving mode, the switching circuit 231 is turned on by a predetermined period of time at an interval equal to the interval T or NT wherein N is a positive integer equal to or greater than two (2). Thus, the first mobile wireless terminal 203-1 receives radio-signals only while the switching circuit 231 is on, ensuring reduction in power consumption.

If the above-mentioned request is not generated in the first mobile wireless terminal 203-1 (NO in step S302), the first mobile wireless terminal 203-1 checks whether the first mobile wireless terminal 203-1 is requested to carry out other steps, in step S303.

If requested (YES in step S303), the central processing unit 221 in the first mobile wireless terminal 203-1 carries out requested steps, in step S308.

Figure 1:
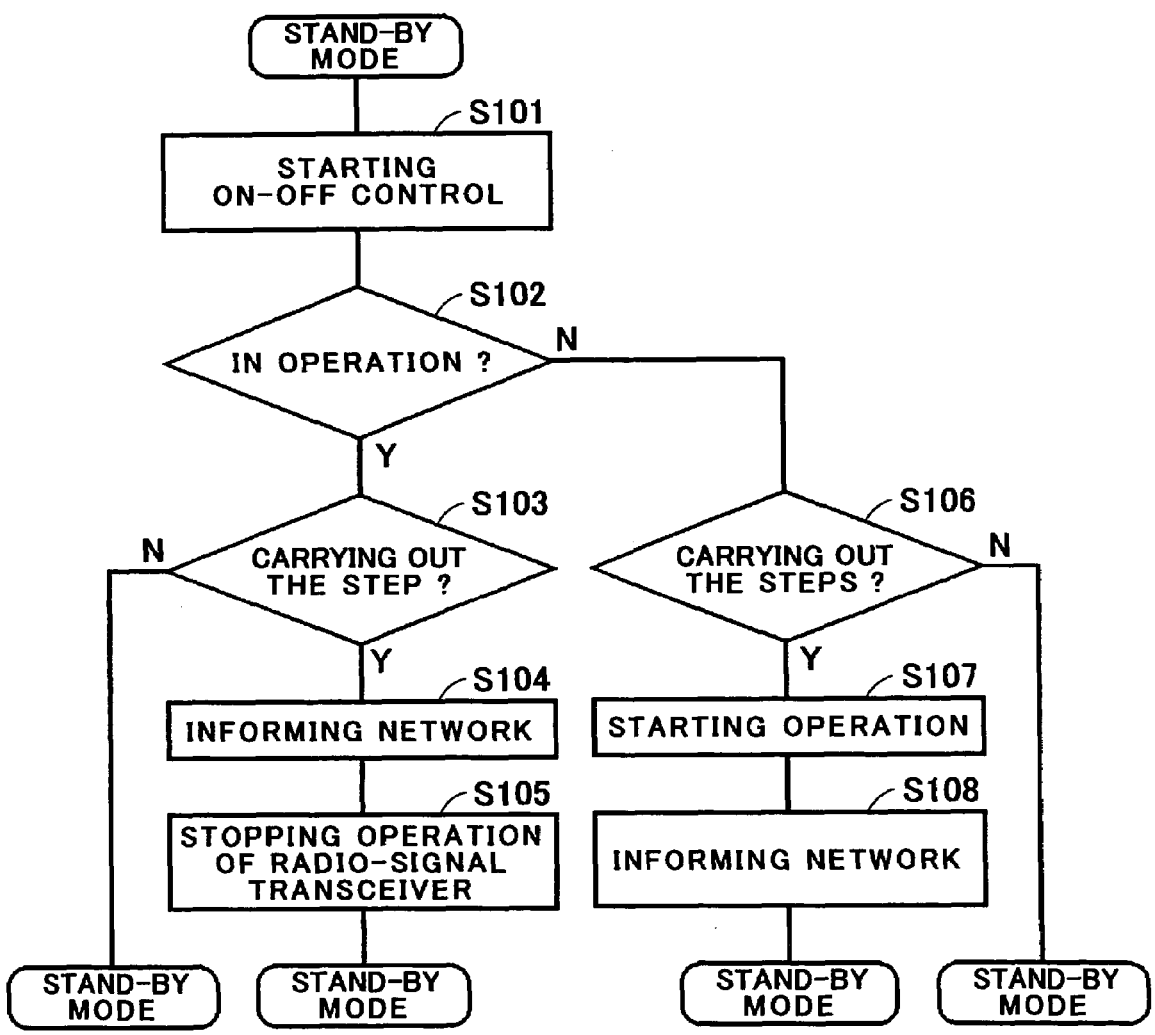
FIG. 1 is a flow-chart showing steps to be carried out in a conventional wireless communication system.
Figure 2:
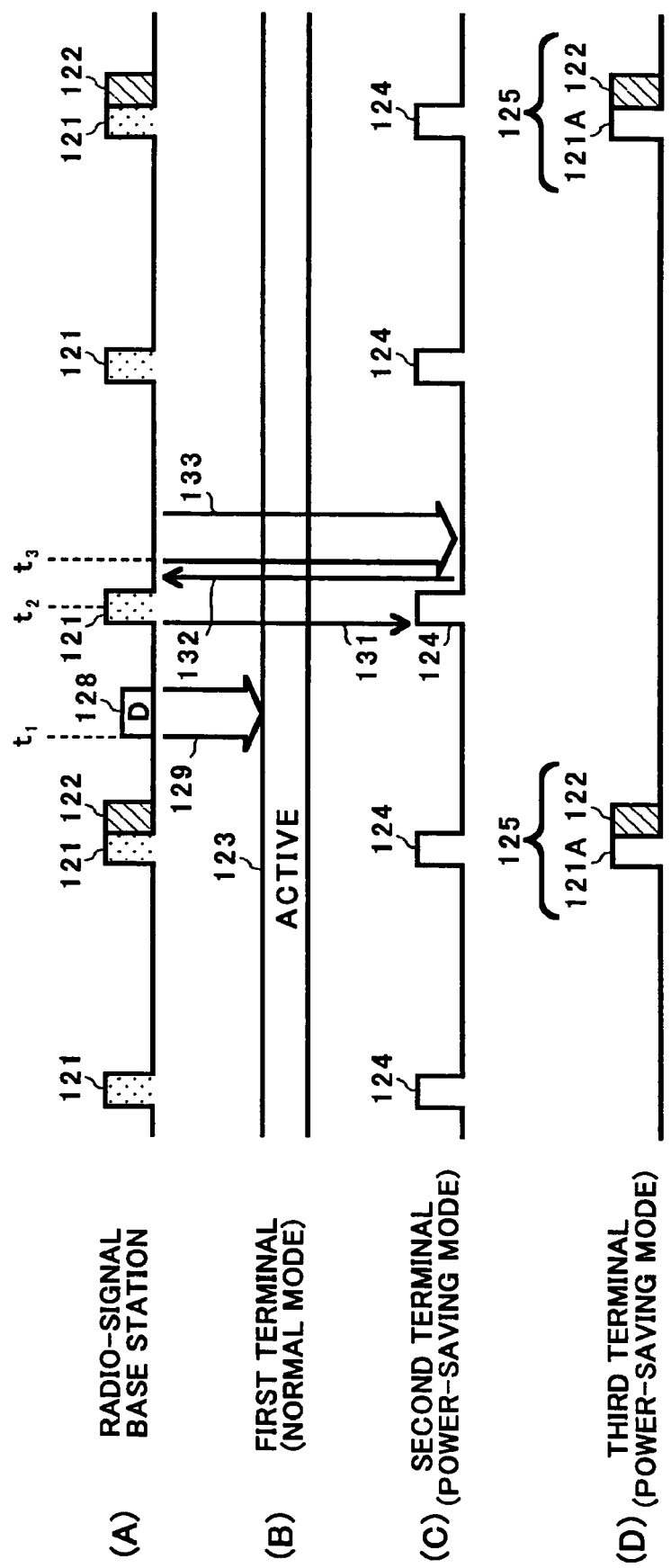
FIG. 2 is a time chart showing operations of a radio-signal base station and mobile wireless terminals in the conventional wireless communication system.

Unlike the conventional wireless communication system illustrated in FIG. 2, it is not always necessary for the first mobile wireless terminal 203-1 being in a power-saving mode to turn the switching circuit 231 on at a timing at which the informative signal 121A to which a transmission-traffic displaying message is attached is received. In other words, it is not necessary for each of the first to N-th mobile wireless terminals 203-1 to 203-N to compulsorily receive multiple-address packets in a power-saving mode. This is because multiple-address addresses for settling physical layers of the first to N-th mobile wireless terminals 203-1 to 203-N are dealt with in the radio-signal base station 202 or in the external controller 207.

On receipt of control packets transmitted from the first mobile wireless terminal 203-1, the radio-signal base station 202 analyzes the received control packets, and knows that the first mobile wireless terminal 203-1 has transferred into a power-saving mode. Hereinafter, the radio-signal base station 202 temporarily stores packet signals addressed to the first mobile wireless terminal 203-1, in the cache memory 256, until the first mobile wireless terminal 203-1 informs the radio-signal base station 202 that the first mobile wireless terminal 203-1 transfers into a normal mode. Then, the radio-signal base station 202 informs the first mobile wireless terminal 203-1 through the use of traffic-displaying map included in the informative signal 121 that packet signals addressed to the first mobile wireless terminal 203-1 are temporarily stored in the radio-signal base station 202.

If the first mobile wireless terminal 203-1, on receipt of the informative signal 121 from the radio-signal base station 202, requests the radio-signal base station 202 to transmit the packet signals to transmit to the first mobile wireless terminal 203-1, the radio-signal base station 202 reads the packet signals out of the cache 256, and transmits them to the first mobile wireless terminal 203-1.

As mentioned above, steps carried out by the first mobile wireless terminal 203-1 for receiving the packet signals addressed to the first mobile wireless terminal 203-1, from the radio-signal base station 202 are identical with the steps carried out in the conventional wireless communication system illustrated in FIG. 2.

In order to much reduce power consumption, the first mobile wireless terminal 203-1 is designed to receive the informative signals 121 transmitted from the radio-signal base station 202, at an interval T determined by the first mobile wireless terminal 203-1 itself Specifically, the first mobile wireless terminal 203-1 checks receive signal strength indication (RSSI) and frame error rate (FER) of the informative signals transmitted from the radio-signal base station 202. If the first mobile wireless terminal 203-1 can well receive data packet signals from the radio-signal base station 202, the first mobile wireless terminal 203-1 sets the interval T at which the first mobile wireless terminal 203-1 receives the informative signals 121, equal to N×T in accordance with a frequency at which data packet signals are transmitted, wherein N is a positive integer equal to or greater than two (2). The data packet signals received by the first mobile wireless terminal 203-1 at the interval NT are not necessary to include a transmission-traffic displaying message.

In other words, the first mobile wireless terminal 203-1 can receive the informative signals 121 at an interval different from an interval at which the informative signals 121A are transmitted from the radio-signal base station 202. In this point, the wireless communication system in accordance with the first embodiment is structurally different from the conventional wireless communication system illustrated in FIG. 2. Thus, when any one of the first to N-th mobile wireless terminals 203-1 to 203-N is set into a power-saving mode, power consumption can be further reduced.

The wireless communication system in accordance with the first embodiment is effective particularly when the first mobile wireless terminal 203-1 is located far away from the radio-signal base station 202, and hence, is out of a service area.

In the first embodiment, when the first mobile wireless terminal 203-1 cannot receive the informative signals 121 transmitted from the radio-signal base station 202, it is judged that the first mobile wireless terminal 203-1 moves out of a service area. Being out of a service area, the first mobile wireless terminal 203-1 cannot receive the informative signals 121A either.

However, it is not necessary for the first mobile wireless terminal 203-1 in the first embodiment to acquire information to settle a physical address with the multiple-address packets 122 (see FIG. 2) following the informative signals 121A. Hence, when the first mobile wireless terminal 203-1 is judged to move out of a service area, the switching circuit 231 is turned on by a predetermined period of time at an interval equal to NT wherein T is an interval at which the first mobile wireless terminal 203-1 usually receives the informative signals 121, and N is a positive integer equal to or greater than two (2). Thus, power consumption in the first mobile wireless terminal 203-1 can be significantly reduced when the first mobile wireless terminal 203-1 is out of a service area.

It is now assumed that the first mobile wireless terminal 203-1 is in a power-saving mode, and packet signals including voice data and addressed to the first mobile wireless terminal 203-1 are transmitted to the radio-signal base station 202 from the multi-media terminal 206.

Figure 7:
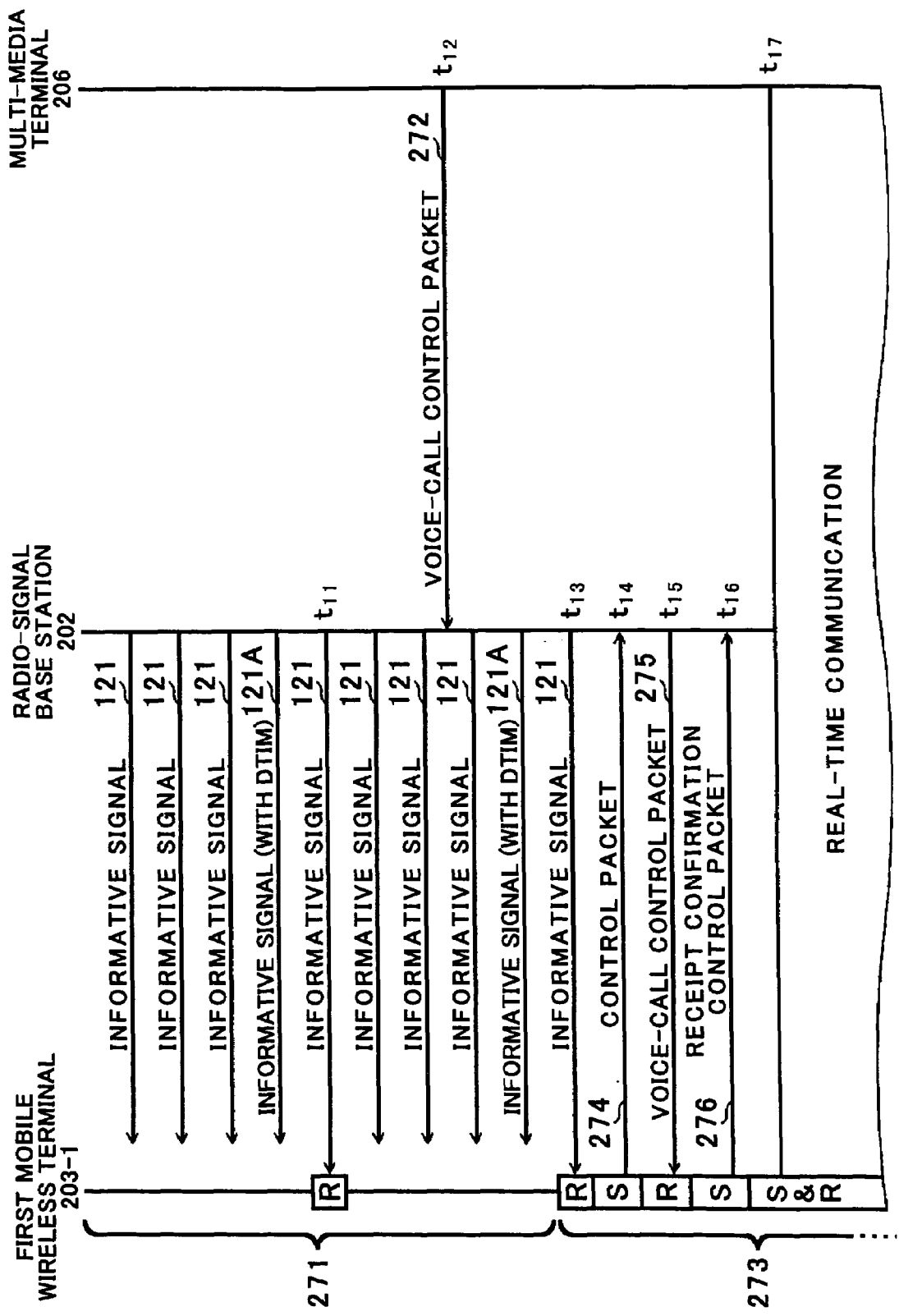
FIG. 7 is a sequence chart showing operations of a mobile wireless terminal, a radio-signal base station and a multi-media terminal in the first embodiment.
Figure 8:
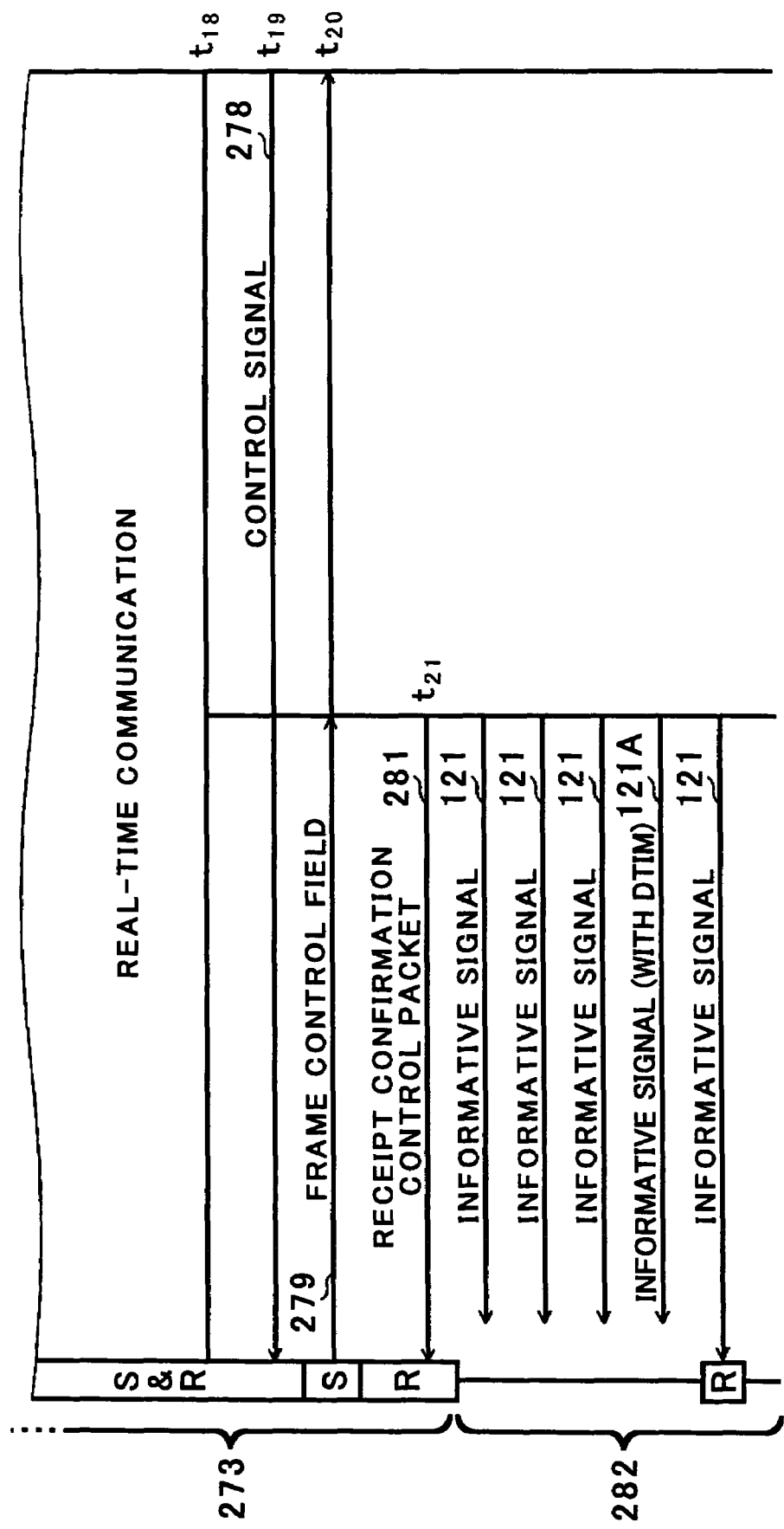
FIG. 8 is a continuation of FIG. 7.

FIGS. 7 and 8 are sequence charts showing operations of the first mobile wireless terminal 203-1, the radio-signal base station 202 and the multi-media terminal 206 in the first embodiment. FIG. 7 is a sequence chart showing steps to be carried out after packet signals including voice data are transmitted to the radio-signal base station 202 until the voice data is transmitted at real-time communication, and FIG. 8 is a sequence chart showing steps to be carried out after the real-time communication has started until the real-time communication ends.

In FIGS. 7 and 8, "R" indicates receipt of packet signals in the first mobile wireless terminal 203-1, "S" indicates transmission of packet signals from the first mobile wireless terminal 203-1, and "S&R" indicates continuous receipt and transmission of packet signals in the first mobile wireless terminal 203-1. In FIGS. 7 and 8, time goes by from the tops towards the bottoms.

As illustrated in FIG. 7, the first mobile wireless terminal 203-1 intermittently receives the informative signals 121 at an interval equal to NT in a time zone 271, wherein N is a positive integer equal to or greater than two (2), and T is an interval at which the informative signals 121 are transmitted from the radio-signal base station 202. For instance, the first mobile wireless terminal 203-1 receives the informative signal 121 at time t11 independently of the informative signal 121A having DTIM.

It is assumed that the multi-media terminal 206 transmits voice-call control packet 272 addressed to the first mobile wireless terminal 203-1, to the radio-signal base station 202 at time t12 later than the time t11.

As having explained with reference to FIG. 6, the radio-signal base station 202 is already aware that the first mobile wireless terminal 203-1 has transferred into a power-saving mode. Accordingly, the radio-signal base station 202 temporarily stores the received voice-call control packet 272 in the cache 256.

The first mobile wireless terminal 203-1 receives the informative signal 121 at time t13 subsequently to the time t11. The first mobile wireless terminal 203-1 is kept in communication with the radio-signal base station 202 in a time zone 273 from the time t13 to a later mentioned time t21.

On receipt of the informative signal 121, the first mobile wireless terminal 203-1 becomes aware that packet signals addressed to the first mobile wireless terminal 203-1 are stored in the radio-signal base station 202, due to a traffic-displaying map included in the received informative signal 121. Hence, the first mobile wireless terminal 203-1 transmits a control packet 274 to the radio-signal base station 202 at time t14 to request the radio-signal base station 202 to transmit the packet signals addressed to the first mobile wireless terminal 203-1, to the first mobile wireless terminal 203-1.

On receipt of the request from the first mobile wireless terminal 203-1, the radio-signal base station 202 transmits the voice-call control packet 275 stored in the cache 256, to the first mobile wireless terminal 203-1 at time t15. The first mobile wireless terminal 203-1 receives the voice-call control packet 275 as a usual packet signal. Then, the first mobile wireless terminal 203-1 checks whether the received voice-call control packet 275 is a packet signal which should be received at real-time communication (hereinbelow, such a packet signal is called "real-time communication packet signal").

Figure 9:
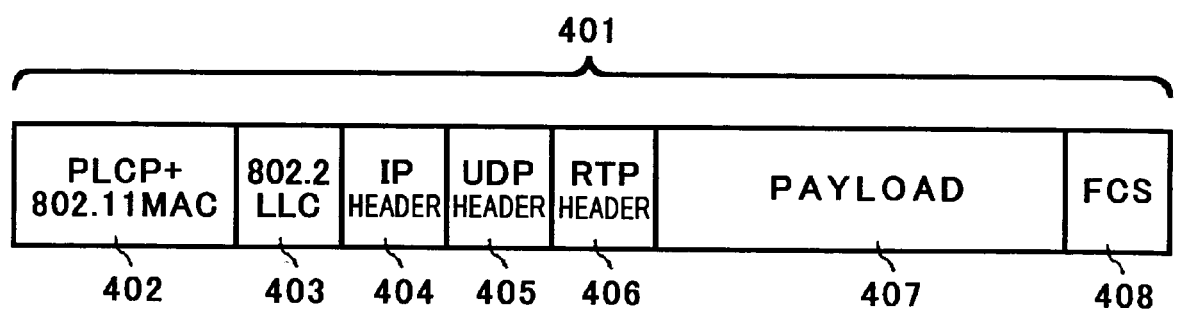
FIG. 9 is a view illustrating a wireless frame indicating that the packet signals should be received at real-time communication, in the first embodiment.

FIG. 9 illustrates a wireless frame 401 used when the received packet signal is a real-time communication packet signal.

The wireless frame 401 is comprised of a media access control (MAC) layer 402 defined in accordance with the physical layer convergence protocol (PLCP) +802.11 as a protocol for transmitting and receiving data about a physical layer such as a transmission rate or a length of a frame in IEEE (The Institute of Electrical and Electronics Engineers, Inc.) 802.11 wireless LAN standardization group, a logical link control (LLC) layer 403 acting as an upper-level layer to a data link layer, an IP (Internet protocol) header 404 as a protocol belonging to a network layer, a user datagram protocol (UDP) header 405 as a protocol belonging to a transport hierarchy, a real-time transport protocol (RTP) header 406, a payload 407 such as voice data, and a frame check sequence (FCS) 408 attached to the frame for checking a transmission error.

The RTP header 406 is a protocol used for transmission of data stream required to be transmitted at real time, such as Internet telephone or delivery of images or voices. Hence, if the wireless frame 401 constituting the packet signals transmitted from the radio-signal base station 202 includes the RTP header 406 therein, the first mobile wireless terminal 203-1 knows that the packet signals are real-time communication packet signals, and hence, transfers into a power-saving mode from a normal mode.

Figure 10:
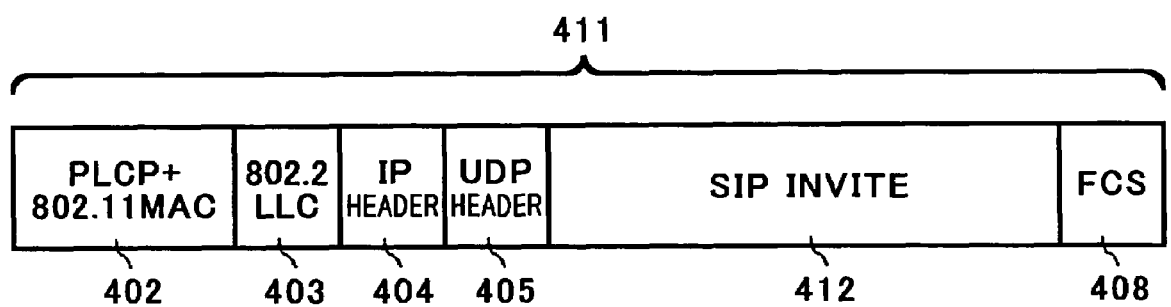
FIG. 10 is a view illustrating an example of a wireless frame received by a mobile wireless terminal to judge whether real-time communication should be carried out.

FIG. 10 illustrates a wireless frame 411 used when the first mobile wireless terminal 203-1 judges whether real-time communication should be carried out.

In comparison with the wireless frame 401 illustrated in FIG. 9, the wireless frame 410 includes a session initiation protocol (SIP) INVITE (media description=audio) 412 in place of the RTP header 406 and the payload 407. The SIP INVITE 412 is located between the UDP header 405 and the FCS 408. The SIP INVITE 412 is a call-control protocol for making, altering or interrupting a multi-media session or call, such as a conference, remote education, Internet telephone or analogous applications. Hence, if the wireless frame 411 constituting the packet signals transmitted from the radio-signal base station 202 includes the SIP INVITE 412 therein, the first mobile wireless terminal 203-1 transfers into a normal mode from a power-saving mode for carrying out real-time communication.

Referring back to FIG. 7, the first mobile wireless terminal 203-1 judges that the received packet signal is a real-time communication packet signal by confirming that the wireless frame 401 illustrated in FIG. 9 includes the RTP header 406. Then, the first mobile wireless terminal 203-1 informs the radio-signal base station 202 of mode transfer from a power-saving mode to a normal mode through the user of a frame control field 276 at time t16.

On receipt of the indication of the mode transfer, the radio-signal base station 202 transmits the rest of the voice-call control packets 275 stored in the cache 256, to the first mobile wireless terminal 203-1. On receipt of a response from the first mobile wireless terminal 203-1, the radio-signal base station 202 prepares continuous transmission of packet signals indicative of voice data.

After time t17, the radio-signal base station 202 transmits packet signals received from the multi-media terminal 206 and indicative of voice data, to the first mobile wireless terminal 203-1 which has transferred to a normal mode without temporarily storing in the cache 256. Thus, the first mobile wireless terminal 203-1 can continuously receive packet signals indicating voice data, without a pause, and reproduce the received voice data at real time.

The multi-media terminal 206 finishes transmission of packet signals indicative of voice data at time t18, and then, transmits a voice-call control packet as a control signal 278 to the first mobile wireless terminal 203-1 at time t19 to inform the first mobile wireless terminal 203-1 that voice-call should be interrupted. In response, the first mobile wireless terminal 203-1 informs the radio-signal base station 202 at time t20 of interruption of voice-call through a frame control field 279. This is also informed to the multi-media terminal 206 from the radio-signal base station 202. Thus a process of transmission of voice data is finished.

At time t21, the radio-signal base station 202 transmits a receipt confirmation control packet 281 to the first mobile wireless terminal 203-1 in response to the frame control field 279. In a time zone 282 starting from the time t21, the first mobile wireless terminal 203-1 receives the informative signals 121 at a predetermined interval, similarly to intermittent receipt of the informative signals 121 in the time zone 271.

In the first embodiment, the multi-media terminal 206 interrupts communication at time t19. As an alternative, the first mobile wireless terminal 203-1 may interrupt communication, in which case, after the first mobile wireless terminal 203-1 interrupts communication, the first mobile wireless terminal 203-1 receives a message indicating that interruption has been finished, from the multi-media terminal 206. On receipt of the message, the first mobile wireless terminal 203-1 informs the radio-signal base station 202 through a frame control field that the first mobile wireless terminal 203-1 will receive the informative signals 121 in a power-saving mode. In a subsequent time zone 282, the first mobile wireless terminal 203-1 receives the informative signals 121 at a relatively long interval.

As explained above, when the first mobile wireless terminal 203-1 which is in a power-saving mode receives voices or images at real-time communication, the first mobile wireless terminal 203-1 informs the radio-signal base station 202 that the first mobile wireless terminal 203-1 transfers to a normal mode from a power-saving mode. Thereafter, the first mobile wireless terminal 203-1 can receive packet signals from the radio-signal base station 202 at real-time communication without delay. After the real-time communication has been finished, the first mobile wireless terminal 203-1 transfers again to a power-saving mode, ensuring reduction in power consumption.

If the first mobile wireless terminal 203-1 becomes aware that packet signals are not necessary to be received at real-time communication, by checking a control packet transmitted from the radio-signal base station 202, the first mobile wireless terminal 203-1 is kept in a power-saving mode, and intermittently receives packet signals stored in the cache 256, from the radio-signal base station 202.

In the wireless communication system in accordance with the first embodiment, the first mobile wireless terminal 203-1 being in a power-saving mode can intermittently receive the informative signals 121 at an interval which is independent of an interval at which the informative signals 121A with DTIM are transmitted. In other words, even if data should be transmitted to all of the first to N-th mobile wireless terminals 203-1 to 203-N at multiple-address communication, it is possible to transmit such data to a target mobile wireless terminal through other route.

Figure 11:
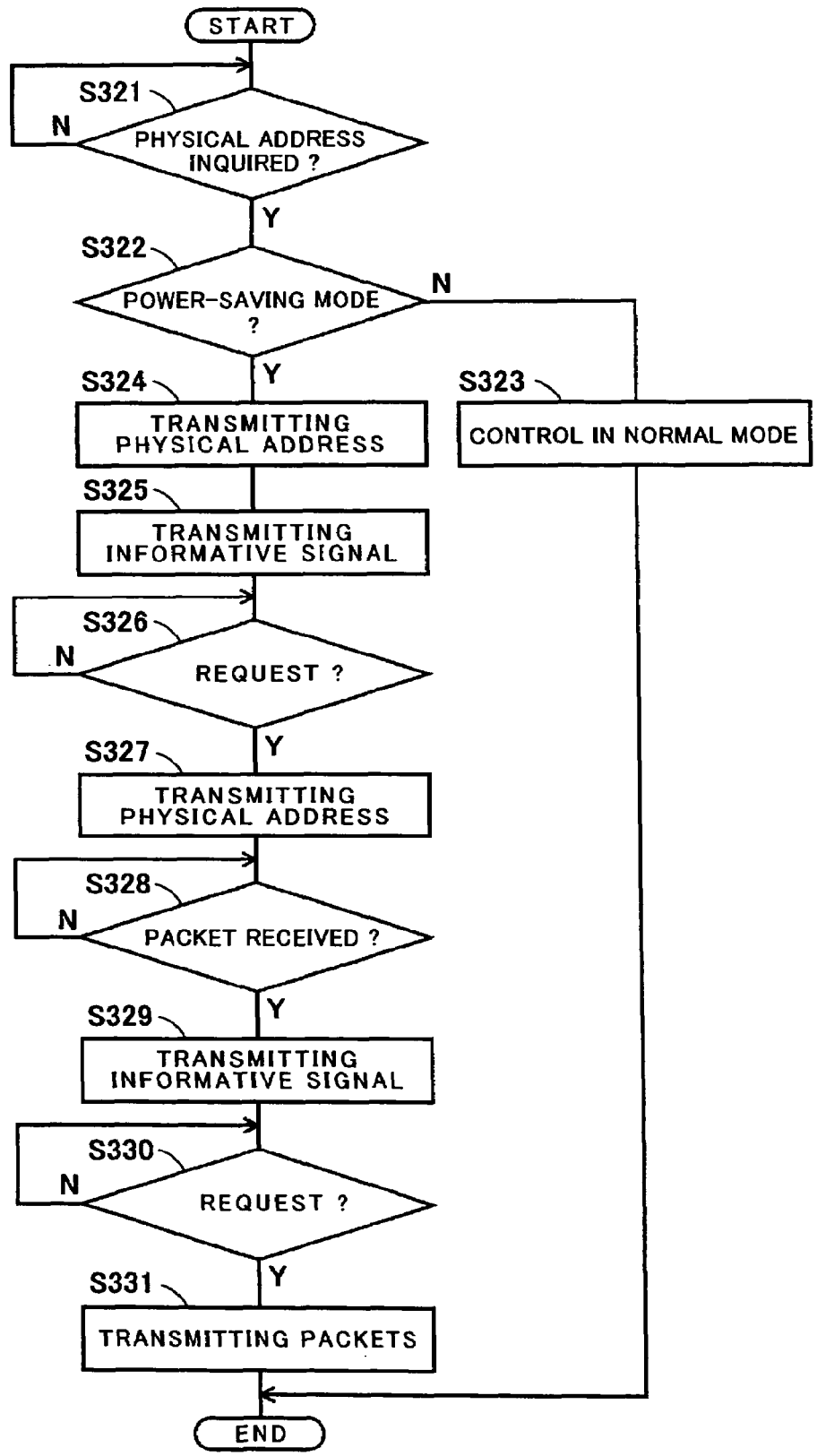
FIG. 11 is a flow-chart showing steps carried out by a radio-signal base station when a multi-media terminal transmits packet signals to a mobile wireless terminal which is in a power-saving mode.

FIG. 11 is a flow-chart showing steps to be carried out by the radio-signal base station 202 when the multi-media terminal 206 transmits packet signals to the first mobile wireless terminal 203-1 being in a power-saving mode.

It is now assumed that the multi-media terminal 206 inquires the radio-signal base station 202 of a physical address of the radio-signal base station 202 in order to transmit packet signals to the first mobile wireless terminal 203-1, in step S321.

On receipt of such an inquiry (YES in step S321), the radio-signal base station 202 checks whether the first mobile wireless terminal 203-1 is in a power-saving mode, in step S322. As mentioned earlier, when the first to N-th mobile wireless terminals 203-1 to 203-N transfer to a power-saving mode from a normal mode and vice versa, the first to N-th mobile wireless terminals 203-1 to 203-N inform the radio-signal base station 202 of such mode transfer. Accordingly, the radio-signal base station 202 is always aware that each of the first to N-th mobile wireless terminals 203-1 to 203-N is in which mode.

If the first mobile wireless terminal 203-1 is not in a power-saving mode (NO in step S322), a control is carried out in accordance with a normal mode, in step S323. Specifically, the above-mentioned inquiry is combined to a multiple-address packet transmitted from the radio-signal base station 202 subsequently to the informative signal 121A with DTIM, and the first mobile wireless terminal 203-1 makes a response to the inquiry. This operation is identical to the operation carried out in the conventional wireless communication system.

An inquiry of a physical address, combined to a multiple-address packet transmitted from the radio-signal base station 202 at a certain interval, is not always relevant to the first mobile wireless terminal 203-1. Hence, even if the first mobile wireless terminal 203-1 is in a power-saving mode, much power is consumed, if each of the first to N-th mobile wireless terminals 203-1 to 203-N activates its signal-receiving circuit to check all of multiple-address packets for judging whether the multiple-address packets are addressed thereto. In the first embodiment, multiple-address packets are dealt with in either the radio-signal base station 202 or the external controller 207, ensuring that it is no longer necessary for a mobile wireless terminal being in a power-saving mode to receive multiple-address packets. Accordingly, the radio-signal base station 202 is not necessary to unnecessarily transmit multiple-address packets, which ensures reduction in consumption of limited wireless bands.

If the first mobile wireless terminal 203-1 is in a power-saving mode (YES in step S322), the radio-signal base station 202 transmits a physical address of the first mobile wireless terminal 203-1 to the multi-media terminal 206 on behalf of the first mobile wireless terminal 203-1, in step S324.

Figure 12:
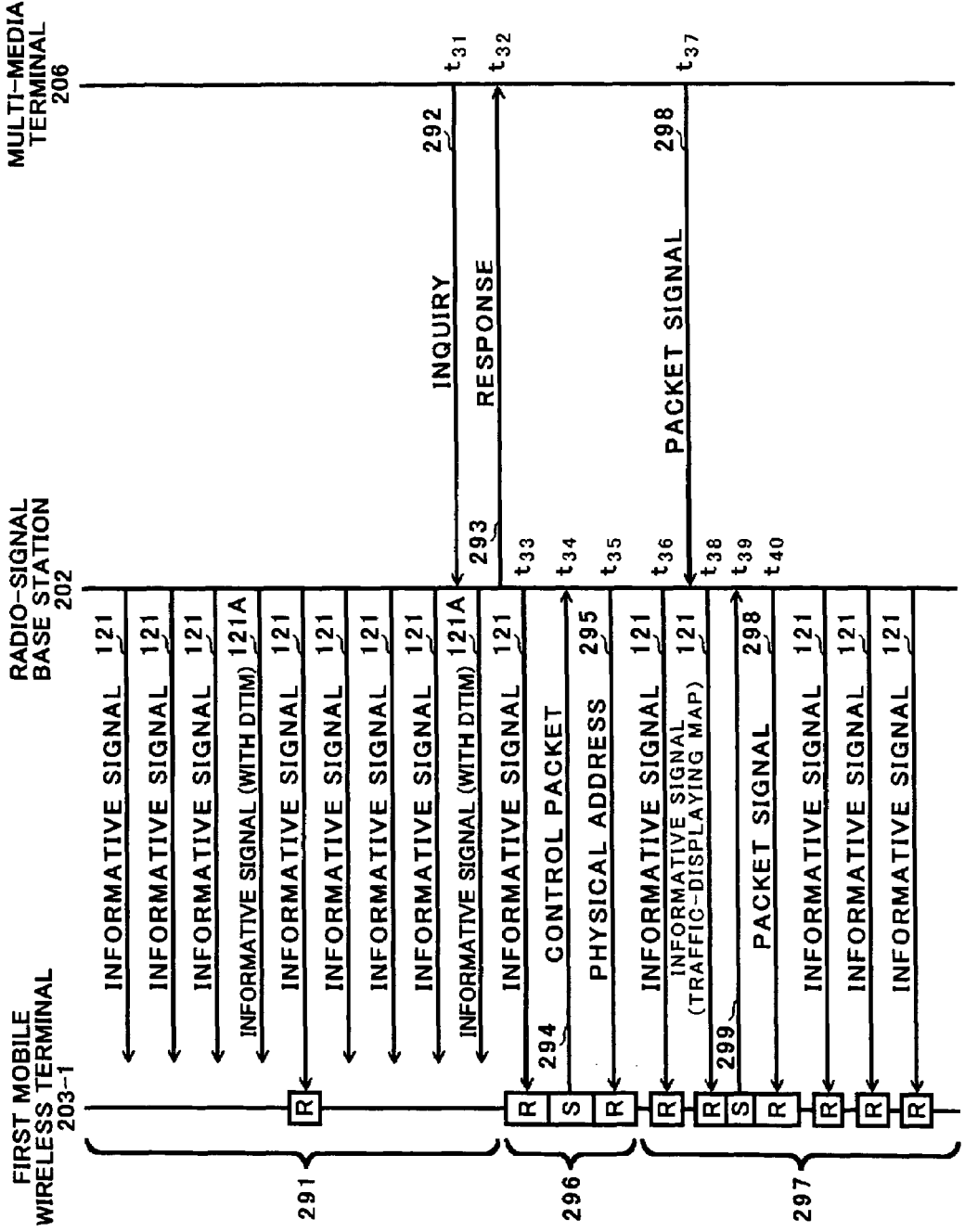
FIG. 12 is a sequence chart showing operations of a mobile wireless terminal, a radio-signal base station and a multi-media terminal in the first embodiment.

FIG. 12 is a sequence chart showing steps carried out by the first mobile wireless terminal 203-1, the radio-signal base station 202 and the multi-media terminal 206 when the radio-signal base station 202 makes a response to the multi-media terminal 206 on behalf of the first mobile wireless terminal 203-1.

In FIG. 12, "R" indicates receipt of packet signals in the first mobile wireless terminal 203-1, "S" indicates transmission of packet signals from the first mobile wireless terminal 203-1. In FIG. 12, time goes by from the top towards the bottom. In FIG. 12, the first mobile wireless terminal 203-1 is in a power-saving mode, and receives the informative signals 121 at a long interval in a time zone 291.

It is assumed that the multi-media terminal 206 inquires the radio-signal base station 202 of a physical address of the first mobile wireless terminal 203-1 through a packet signal 292 at time t31 in the time zone 291.

The radio-signal base station 202 judges that the first mobile wireless terminal 203-1 is in a power-saving mode (YES in step S322), and transmits a physical address of the first mobile wireless terminal 203-1 to the multi-media terminal 206 in the form of a packet signal 293 at time t32 on behalf of the first mobile wireless terminal 203-1, in step S324.

Then, the radio-signal base station 202 combines information indicating that packet signals addressed to the first mobile wireless terminal 203-1 will be soon received, to a traffic-displaying map included in the informative signal 121 which will be received by the first mobile wireless terminal 203-1 at time t33, and transmits the informative signal 121 to the first mobile wireless terminal 203-1, in step S325. This is based on the inquiry about a physical address of the first mobile wireless terminal 203-1, transmitted from the multi-media terminal 206.

On receipt of the informative signal 121, the first mobile wireless terminal 203-1 develops the informative signal 121, and becomes aware that there are packet signals addressed thereto. At time t34, the first mobile wireless terminal 203-1 transmits a control packet 294 to the radio-signal base station 202 to request the radio-signal base station 202 to transmit packet signals temporarily stored in the cache 256, to the first mobile wireless terminal 203-1.

On receipt of the control packet 294 (YES in step S326), the radio-signal base station 202 transmits a physical address of the multi-media terminal 206 to the first mobile wireless terminal 203-1 as a packet signal 295 at time t35, in step S327. Thereafter, the radio-signal base station 202 waits for packet signals addressed to the first mobile wireless terminal 203-1, to be transmitted from the multi-media terminal 206, in step S328.

The first mobile wireless terminal 203-1 becomes aware that packet signals will be soon received from the multi-media terminal 206, as a result of making communication with the radio-signal base station 202 in a time zone 296 starting from time t32 and terminating at time t35. Hence, the first mobile wireless terminal 203-1 sets an interval at which the informative signals 121 are received in a power-saving mode, narrower than an interval at which the first mobile wireless terminal 203-1 received the informative signals 121 in the time zone 291. That is, in a time zone 297 starting from time t36, the switching circuit 231 (see FIG. 4) is turned on by a predetermined period of time at a timing at which the informative signals 121 are received.

At time t37, the multi-media terminal 206 transmits a packet signal 298 addressed to the first mobile wireless terminal 203-1, to the radio-signal base station 202. On receipt of the packet signal 298, the radio-signal base station 202 combines information that the packet signals were received, to a traffic-displaying map included in the next informative signal 121, and transmits the informative signal 121 to the first mobile wireless terminal 203-1 at time t38, in step S329.

On receipt of the informative signal 121, the first mobile wireless terminal 203-1 develops the informative signal 121, and finds the packet signals addressed thereto in the traffic-displaying map. Then, at time t39, the first mobile wireless terminal 203-1 transmits a control packet 299 to the radio-signal base station 202 to request the radio-signal base station 202 to transmit the packet signals temporarily stored in the cache 256, to the first mobile wireless terminal 203-1.

On receipt of the control packet 299 (YES in step S330), the radio-signal base station 202 transmits the packet signals 298 temporarily stored in the cache 256, to the first mobile wireless terminal 203-1 at time t40, in step S331.

Thereafter, the first mobile wireless terminal 203-1 repeats receipt of the informative signals 121 at a short interval in a time zone 297. If the first mobile wireless terminal 203-1 does not newly receive a packet signal in the time zone 297, the first mobile wireless terminal 203-1 sets a longer interval at which the first mobile wireless terminal 203-1 receives the informative signal 121, similarly to an interval in the time zone 291.

In the wireless communication system in accordance with the first embodiment, as mentioned above, each of the first to N-th mobile wireless terminals 203-1 to 203-N selects a power-saving mode or a normal mode, based on a received packet signal, and informs the radio-signal base station 202 of a selected mode. Thus, it is possible to accomplish optimal traffic control.

The radio-signal base station 202 may temporarily store a call-control packet, and then, transmit it to the first mobile wireless terminal 203-1. If real-time communication is made, the radio-signal base station 202 makes the first mobile wireless terminal 203-1 transfer into a normal mode, and then, make data source such as the multi-media terminal 206 transmit packet signals as a main part of the data directly to the first mobile wireless terminal 203-1. Accordingly, it is no longer necessary for the radio-signal base station 202 to store a lot of real-time communication packet signals in the cache 256, resulting in that the radio-signal base station 202 is not necessary to include a big-capacity memory as the cache 256.

In the first embodiment, the multi-media terminal 206 transmits voice data to the first mobile wireless terminal 203-1. As an alternative, the multi-media terminal 206 may transmit image data to the first mobile wireless terminal 203-1. In place of the multi-media terminal 206, the multi-media server 205 may make real-time communication with any one of the first to N-th mobile wireless terminals 203-1 to 203-N.

Second Embodiment

Figure 13:
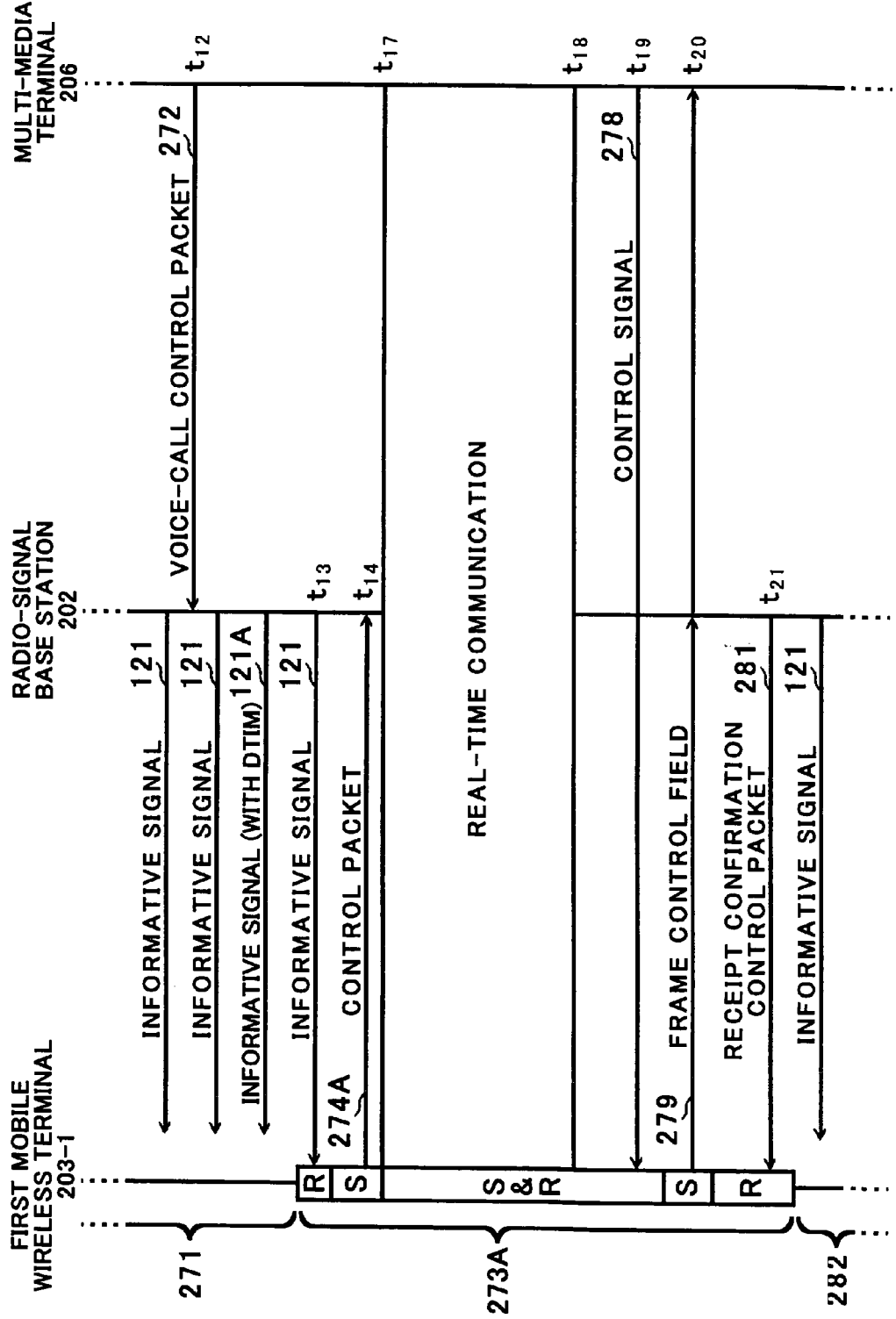
FIG. 13 is a sequence chart showing operations of a mobile wireless terminal, a radio-signal base station and a multi-media terminal in the second embodiment.

FIG. 13 is a sequence chart showing steps carried out by the first mobile wireless terminal 203-1, the radio-signal base station 202 and the multi-media terminal 206 when the radio-signal base station 202 receives a voice-call control packet, in the wireless communication system in accordance with the second embodiment.

Parts that correspond to those in FIGS. 7 and 8 have been provided with the same reference numerals.

In the second embodiment, the first mobile wireless terminal 203-1 starts real-time communication without judgment as to whether real-time communication is necessary to be carried out.

At time t12 in FIG. 13, the multi-media terminal 206 transmits a voice-call control packet 272 addressed to the first mobile wireless terminal 203-1, to the radio-signal base station 202. The radio-signal base station 202 already knows that the first mobile wireless terminal 203-1 is in a power-saving mode. Hence, the radio-signal base station 202 stores the voice-call control packet 272 transmitted from the multi-media terminal 206, in the cache 256. At time t13 which is a first timing, after the time t12, at which the first mobile wireless terminal 203-1 receives the informative signal 121, the first mobile wireless terminal 203-1 receives the informative signal 121.

The first mobile wireless terminal 203-1 makes continuous communication with the radio-signal base station 202 in a time zone 273A starting from time t12 and terminating at time t21.

On receipt of the informative signal 121, the first mobile wireless terminal 203-1 knows that the packet signals are stored in the cache 256 in the radio-signal base station 202, due to the traffic-displaying map included in the informative signal 121. At this time, the first mobile wireless terminal 203-1 cannot know whether the stored packet signals are real-time communication packet signals.

However, at time t14, the first mobile wireless terminal 203-1 transmits a control packet 274A to the radio-signal base station 202 to request the radio-signal base station 202 to transmit packet signals addressed to the first mobile wireless terminal 203-1, to the first mobile wireless terminal 203-1, and further to inform the radio-signal base station 202 that the first mobile wireless terminal 203-1 has transferred to a normal mode from a power-saving mode.

On receipt of the control packet 274A, the radio-signal base station 202 transmits packet signals indicative of voice data and transmitted from the multi-media terminal 206, to the first mobile wireless terminal 203-1 which is now in a normal mode, after time t17, without temporarily storing the packet signals in the cache 256. Thus, the first mobile wireless terminal 203-1 can continuously receive the packet signals without time delay, and can reproduce the received packet signals at real time. Hereinbelow, the steps are carried out in the same way as the first embodiment.

It should be noted that the first mobile wireless terminal 203-1 is kept in a normal mode only when the first mobile wireless terminal 203-1 confirms that the packet signals transmitted from the radio-signal base station 202 are real-time communication packet signals Thus, comparing to the first embodiment, the second embodiment can omit a period of time for preparation of commencement of real-time communication, specifically, a period of time starting from time t15 and terminating at time t17.

Figure 14:
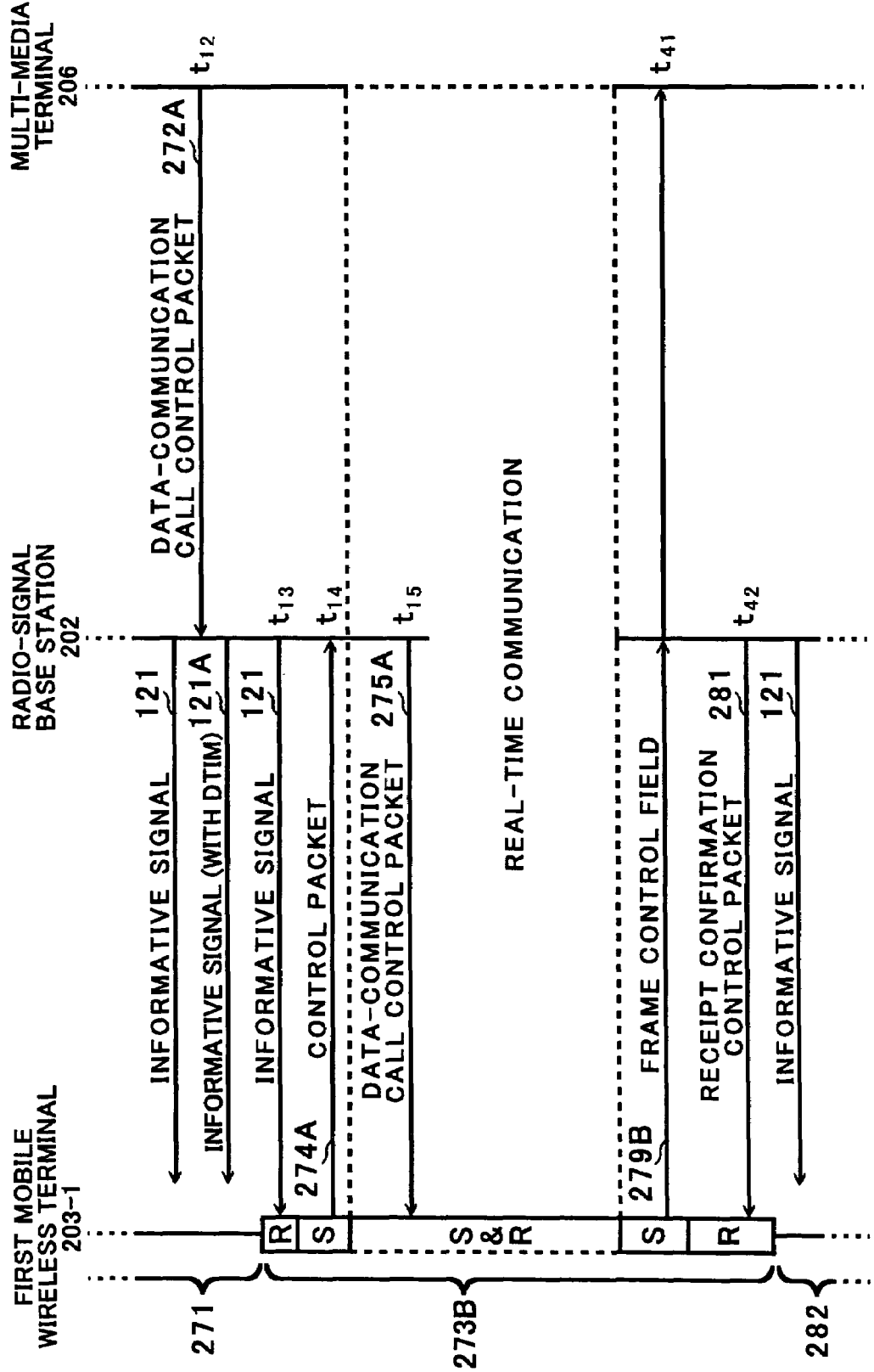
FIG. 14 is a sequence chart showing operations of a mobile wireless terminal, a radio-signal base station and a multi-media terminal in the second embodiment.

FIG. 14 is a sequence chart showing steps carried out by the first mobile wireless terminal 203-1, the radio-signal base station 202 and the multi-media terminal 206 when the radio-signal base station 202 receives a call control packet other than a real-time communication packet, in the wireless communication system in accordance with the second embodiment.

In the operation shown in FIG. 13, the first mobile wireless terminal 203-1 starts real-time communication without judging whether the packet signals are real-time communication packet signals, but the first mobile wireless terminal 203-1 actually receives voice-data or real-time communication data, resulting in that the first mobile wireless terminal 203-1 could make most effective communication.

In contrast, in the operation shown in FIG. 14, the multi-media terminal 206 transmits a data-communication call control packet 272A as one of packets which are not necessary to be transmitted in real-time communication, to the radio-signal base station 202 at time t12. As a result, the first mobile wireless terminal 203-1 receives the informative signal 121 at time t13.

The first mobile wireless terminal 203-1 makes continuous communication with the radio-signal base station 202 in a time zone 273B starting from time t13 and terminating at time t42.

On receipt of the informative signal 121, the first mobile wireless terminal 203-1 knows that the packet signals are stored in the cache 256 in the radio-signal base station 202, due to the traffic-displaying map included in the informative signal 121. At this time, the first mobile wireless terminal 203-1 cannot know whether the stored packet signals are real-time communication packet signals.

However, at time t14, the first mobile wireless terminal 203-1 transmits a control packet 274A to the radio-signal base station 202 to request the radio-signal base station 202 to transmit packet signals addressed to the first mobile wireless terminal 203-1, to the first mobile wireless terminal 203-1, and further to inform the radio-signal base station 202 that the first mobile wireless terminal 203-1 has transferred to a normal mode from a power-saving mode.

On receipt of the control packet 274A, the radio-signal base station 202 transmits packet signals transmitted from the multi-media terminal 206, to the first mobile wireless terminal 203-1 which is now in a normal mode without temporarily storing the packet signals in the cache 256. Then, the radio-signal base station 202 transmits communication data transmitted from the multi-media terminal 206, to the first mobile wireless terminal 203-1 by a predetermined data volume, confirming data transmission to and data receipt from the first mobile wireless terminal 203-1.

The first mobile wireless terminal 203-1 judges whether coming packet signals are real-time communication packet signals, based on the data-communication call control packet 275A received at time t15. If the packet signals are judged to be real-time communication packet signals, the sequence illustrated in FIG. 13 is carried out.

In contrast, if the packet signals are judged to be packet signals which are not necessary to be received at real-time communication, the first mobile wireless terminal 203-1 informs the radio-signal base station 202 at time t41 that the first mobile wireless terminal 203-1 transfers to a power-saving mode from a normal mode, through a frame control field 279B. In response to the frame control field 279B, the radio-signal base station 202 transmits a receipt confirmation control packet 281 to the first mobile wireless terminal 203-1 at time t42.

Steps to be carried out after time t42 are identical with the steps carried out in the time zone 282 illustrated in FIG. 8. That is, the first mobile wireless terminal 203-1 intermittently receives the informative signals 121 at a certain interval in a power-saving mode.

Figure 15:
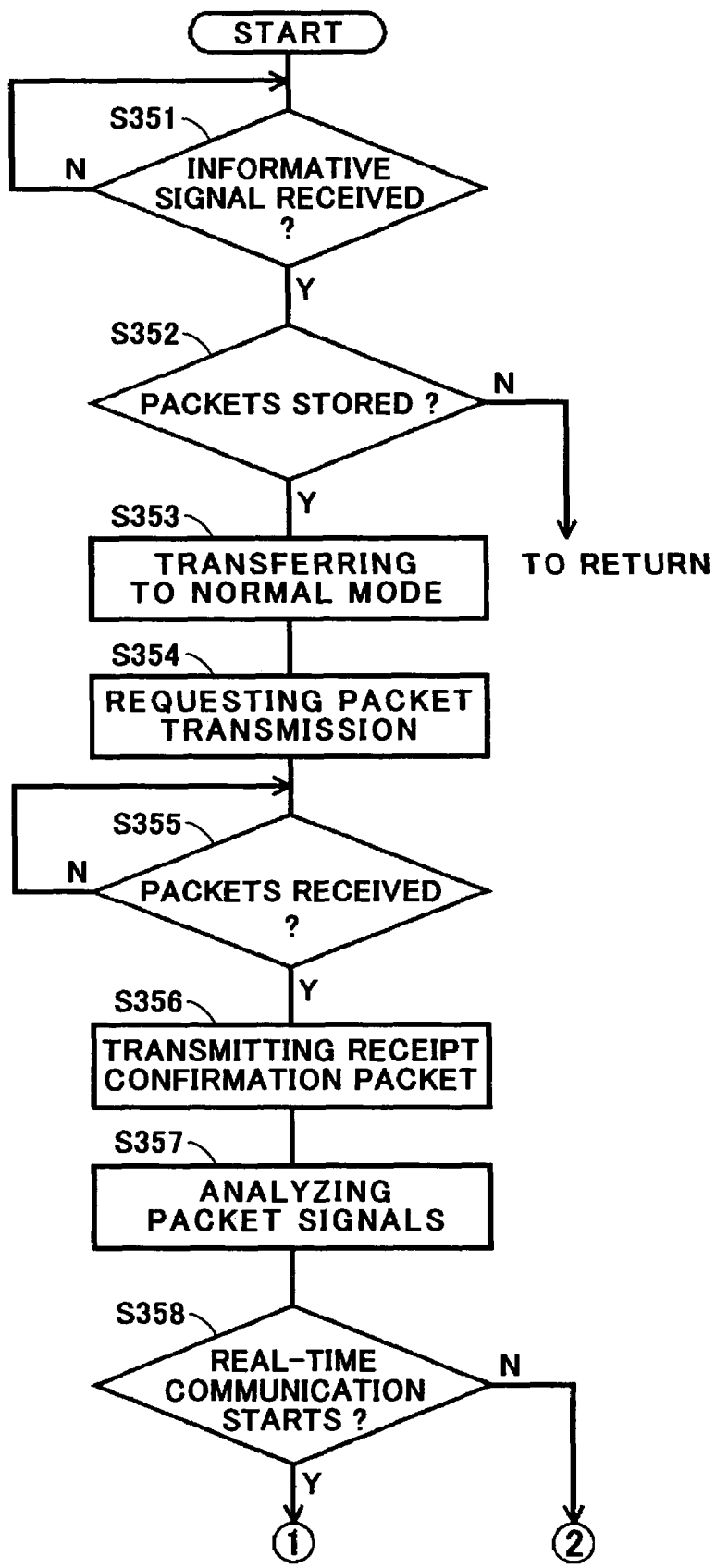
FIG. 15 is a flow-chart showing steps carried out by a mobile wireless terminal being in a power-saving mode to receive packet signals.
Figure 16:
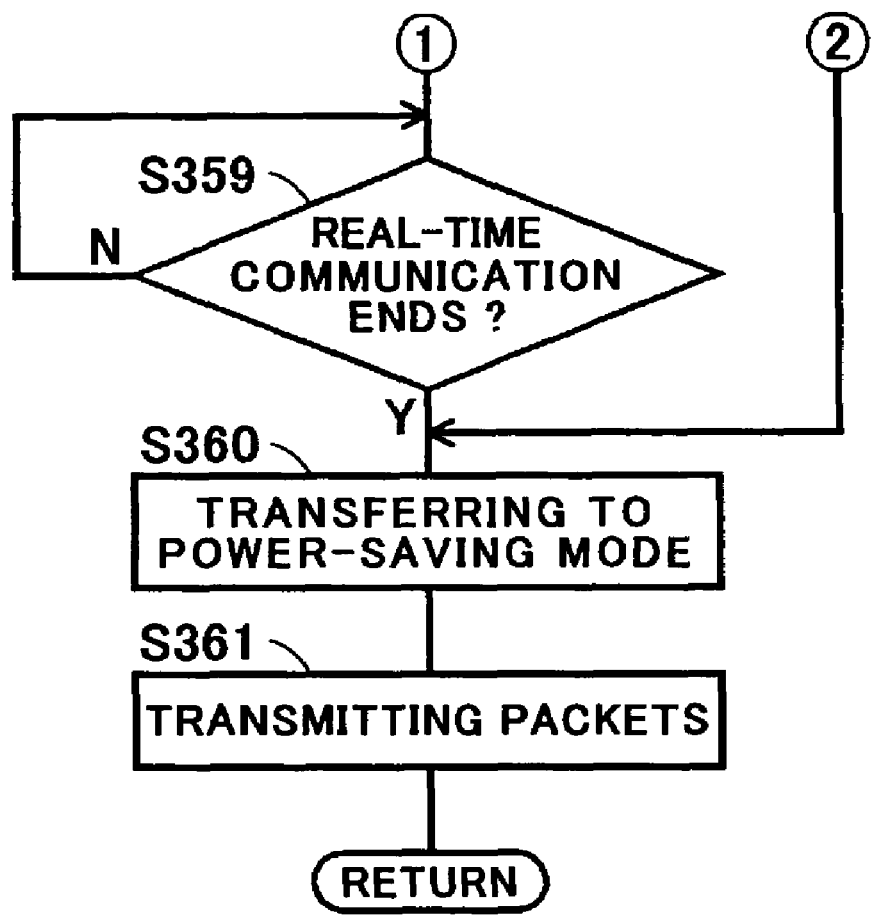
FIG. 16 is a continuation of FIG. 15.

FIGS. 15 and 16 are flow-charts showing steps to be carried out by the first mobile wireless terminal 203-1 in a power-saving mode when receiving packet signals.

On receipt of the informative signal 121 (YES in step S351), the first mobile wireless terminal 203-1 checks a traffic-displaying map included in the informative signal 121 to judge whether packet signals are stored in the cache 256 in the radio-signal base station 202, in step S352.

If the packet signals are stored in the cache 256 (YES in step S352), the first mobile wireless terminal 203-1 transfers into a normal mode, in step S353. Then, the first mobile wireless terminal 203-1 requests the radio-signal base station 202 to transmit the packet signals stored in the cache 256, to the first mobile wireless terminal 203-1, in step S354. On receipt of the packet signals from the radio-signal base station 202 (YES in step S355), the first mobile wireless terminal 203-1 informs the radio-signal base station 202 that the first mobile wireless terminal 203-1 has transferred into a normal mode through the use of a frame control field, in step S356, and further, analyzes the received packet signals, in step S357.

As a result of the analysis, if the first mobile wireless terminal 203-1 judges that real-time communication should be carried out (YES in step S358), the first mobile wireless terminal 203-1 is kept in a normal mode, because the first mobile wireless terminal 203-1 has already informed the radio-signal base station 202 that the first mobile wireless terminal 203-1 transferred into a normal mode.

When the real-time communication has ended (YES in step S359 in FIG. 16), the first mobile wireless terminal 203-1 transfers back to a power-saving mode, in step S360. Then, the first mobile wireless terminal 203-1 informs the radio-signal base station 202 that the first mobile wireless terminal 203-1 has transferred into a power-saving mode, in step S361.

If the first mobile wireless terminal 203-1 judges that real-time communication is not necessary to be carried out (NO in step S358), the first mobile wireless terminal 203-1 transfers back to a power-saving mode, in step S360. Then, the first mobile wireless terminal 203-1 informs the radio-signal base station 202 that the first mobile wireless terminal 203-1 has transferred into a power-saving mode, in step S361.

In the above-mentioned first and second embodiments, the present invention is applied to a wireless communication system using LAN in which the communication cable 204 is used. The present invention may be applied to other wireless communication systems which use a protocol prior to starting communication, and in which data is identified with a protocol.

In the above-mentioned first and second embodiments, the radio-signal base station 202 is designed to make a response on behalf of the first mobile wireless terminal 203-1. As an alternative, the external controller 207 may be designed to do so in place of the radio-signal base station 202.

In the above-mentioned first and second embodiments, mode transfer in each of the first to N-th mobile wireless terminals 203-1 to 203-N is carried out between a normal mode and a power-saving mode by carrying out on-off control to the first interface circuit 223, the MAC processor 225, the base band circuit 226 and the RF section 227 through the switching circuit 231. It should be noted that one or more of the above-mentioned parts may be turned off in a power-saving mode in any way. The switching circuit 231 may have any structure. It is not always necessary for the switching circuit 231 to be comprised of a single on-off control circuit.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2002-334203 filed on Nov. 18, 2002 including specification, claims, drawings and summary is incorporated herein by reference in its entirety.

What is claimed is:

1. A wireless communication system including a radio-signal base station, and at least one mobile wireless terminal which operates in a power-saving mode in which said mobile wireless terminal intermittently receives packet signals, and in a normal mode in which said mobile wireless terminal regularly receives packet signals, wherein when said radio-signal base station receives packet signals addressed to a mobile wireless terminal being in said power-saving mode, said radio-signal base station temporarily stores the received packet signals until said mobile wireless terminal requests said radio-signal base station to transmit said packet signals thereto, and said mobile wireless terminal requests said radio-signal base station to transmit said packet signals thereto and transfers to said normal mode from said power-saving mode, if said mobile wireless terminal judges that the received packet signals are packet signals to be received in real-time communication, said mobile wireless terminal receives entirety of said packet signals in said normal mode, and said mobile wireless terminal transfers to said power-saving mode when said packet signals have been all received in real-time communication, and wherein if said mobile wireless terminal judges that it would not be necessary to carry out real-time communication for receiving entirety of said packet signals, said mobile wireless terminal intermittently receives said packet signals at a certain interval in said power-saving mode.

2. The wireless communication system as set forth in claim 1, wherein if said mobile wireless terminal judges that the received packet signals are packet signal not necessary to be received in real-time communication, said mobile wireless terminal transfers to said power-saving mode from said normal mode.

3. The wireless communication system as set forth in claim 1, wherein said mobile wireless terminal transfers to said power-saving mode when entirety of said packet signals has been received.

4. The wireless communication system as set forth in claim 1, wherein said radio-signal base station periodically transmits an informative signal to said mobile wireless terminal being in said power-saving mode, and said mobile wireless terminal is aware that packet signals addressed to said mobile wireless terminal are stored in said radio-signal base station, by analyzing the received informative signal.

5. The wireless communication system as set forth in claim 4, wherein said mobile wireless terminal receives said informative signal in said power-saving mode at an interval determined by itself.

6. The wireless communication system as set forth in claim 4, wherein said mobile wireless terminal receives said packet signals at an interval at which said mobile wireless terminal receives said informative signal from said radio-signal base station.

7. The wireless communication system as set forth in claim 4, wherein said mobile wireless terminal receives said packet signals at an interval equal to N×I, wherein said I indicates an interval at which said mobile wireless terminal receives said informative signal from said radio-signal base station, and said N is a positive integer equal to or greater than two (2).

8. The wireless communication system as set forth in claim 1, wherein said mobile wireless terminal sets a longer interval at which said mobile wireless terminal receives said packet signals, for a smaller frequency at which said packet signals are transmitted from said radio-signal base station.

9. The wireless communication system as set forth in claim 1, wherein said mobile wireless terminal sets a longer interval at which said mobile wireless terminal receives said packet signals, if said mobile wireless terminal cannot receive said informative signal from said radio-signal base station.

10. The wireless communication system as set forth in claim 1, wherein said mobile wireless terminal checks whether the received packet signals include data indicative of commencement of real-time communication, and if the received packet signals include such data, said mobile wireless terminal judges said packet signal to be received in real-time communication.

11. The wireless communication system as set forth in claim 1, wherein said mobile wireless terminal checks whether the received packet signals include real-time transmission protocol, and if the received packet signals include said real-time transmission protocol, said mobile wireless terminal judges said packet signal to be received in real-time communication.

12. The wireless communication system as set forth in claim 1, wherein said mobile wireless terminal is comprised of a cellular phone.

13. The wireless communication system as set forth in claim 1, wherein said radio-signal base station includes functions of:
  transmitting packet signals for real-time communication to a communication network after certain protocol communication;
  memorizing a mobile wireless terminal(s) which is(are) in said power-saving mode, among a plurality of mobile wireless terminals;
  periodically transmitting an informative signal to said mobile wireless terminal which is in said power-saving mode;
  temporarily storing packet signals addressed to said mobile wireless terminal which is in said power-saving mode;
  when said radio-signal base station stores packet signals addressed to said mobile wireless terminal which is in said power-saving mode, combining information indicating so to said informative signal; and
  on receipt of a request from said mobile wireless terminal to transmit said packet signals stored therein, to said mobile wireless terminal, transmitting said packet signals intermittently to a mobile wireless terminal which is in said power-saving mode, but regularly to said mobile wireless terminal, if said mobile wireless terminal is transferred to said normal mode.

14. The wireless communication system as set forth in claim 1, wherein said mobile wireless terminal includes functions of:
  when said mobile wireless terminal transfers to said power-saving mode from said normal mode, informing said radio-signal base station of such mode-transfer;
  determining an interval at which said mobile wireless terminal receives signals, said interval being equal to N×I wherein N is a positive integer equal to or greater than two (2), and I indicates an interval at which said radio-signal base station transmits said announce signal;
  receiving said informative signal from said radio-signal base station at said interval when said mobile wireless terminal is in said power-saving mode;
  if the received informative signal includes information indicating that said radio-signal base station stores packet signals addressed to said mobile wireless terminal, requesting said radio-signal base station to transmit said packet signals to said mobile wireless terminal;
  judging whether said packet signals are necessary to be received in real-time communication, based on a protocol of the received packet signals;
  requesting said radio-signal base station to transmit all of said packet signals to said mobile wireless terminal, and transferring to said normal mode from said power-saving mode;
  transferring to said power-saving mode from said normal mode when said packet signals have been all transmitted to said mobile wireless terminal.

15. A method of making wireless communication system between a radio-signal base station and at least one mobile wireless terminal which operates in a power-saving mode in which said mobile wireless terminal intermittently receives packet signals, and in a normal mode in which said mobile wireless terminal regularly receives packet signals,
  said method including the steps of:
  (a) receiving packet signals addressed to a mobile wireless terminal being in said power-saving mode;
  (b) temporarily storing the received packet signals until said mobile wireless terminal requests said radio-signal base station to transmit said packet signals thereto;
  (c) requesting said radio-signal base station to transmit said packet signals thereto;
  (d) transferring to said normal mode from said power-saving mode;
  (e) if said mobile wireless terminal judges that the received packet signals are packet signals to be received in real-time communication, receiving entirety of said packet signals in said normal mode; and
  (f) transferring to said power-saving mode when said packet signals have been all received in real-time communication,
  (g) if said mobile wireless terminal judges that it would not be necessary to carry out real-time communication for receiving entirety of said packet signals, intermittently receiving said packet signals at a certain interval in said power-saving mode, the step being carried out by said mobile wireless terminal
  said steps (a) and (b) being carried out by said radio-signal base station, and said steps (c) to (g) being carried out by said mobile wireless terminal.

16. The method as set forth in claim 15, further comprising the step of, if said mobile wireless terminal judges that the received packet signals are packet signal not necessary to be received in real-time communication, transferring to said power-saving mode from said normal mode, said step being carried out by said mobile wireless terminal.

17. The method as set forth in claim 15, further comprising the step of transferring to said power-saving mode when entirety of said packet signals has been received, the step being carried out by said mobile wireless terminal.

18. The method as set forth in claim 15, further comprising the step of periodically transmitting an informative signal to said mobile wireless terminal being in said power-saving mode such that said mobile wireless terminal is aware that packet signals addressed to said mobile wireless terminal are stored in said radio-signal base station, by analyzing the received informative signal, the step being carried out by said radio-signal base station.

19. The method as set forth in claim 18, further comprising the step of receiving said informative signal in said power-saving mode at an interval determined by itself, the step being carried out by said mobile wireless terminal.

20. The method as set forth in claim 18, further comprising the step of receiving said packet signals at an interval at which said mobile wireless terminal receives said informative signal from said radio-signal base station, the step being carried out by said mobile wireless terminal.

21. The method as set forth in claim 18, further comprising the step of receiving said packet signals at an interval equal to N×I, wherein said I indicates an interval at which said mobile wireless terminal receives said informative signal from said radio-signal base station, and said N is a positive integer equal to or greater than two (2), the step being carried out by said mobile wireless terminal.

22. The method as set forth in claim 15, further comprising the step of setting a longer interval at which said mobile wireless terminal receives said packet signals, for a smaller frequency at which said packet signals are transmitted from said radio-signal base station, the step being carried out by said mobile wireless terminal.

23. The method as set forth in claim 15, further comprising the step of setting a longer interval at which said mobile wireless terminal receives said packet signals, if said mobile wireless terminal cannot receive said informative signal from said radio-signal base station, the step being carried out by said mobile wireless terminal.

24. The method as set forth in claim 15, further comprising the steps of checking whether the received packet signals include data indicative of commencement of real-time communication, and, if the received packet signals include such data, judging said packet signal to be received in real-time communication, the steps being carried out by said mobile wireless terminal.

25. The method as set forth in claim 15, further comprising the steps of checking whether the received packet signals include real-time transmission protocol, and, if the received packet signals include said real-time transmission protocol, judging said packet signal to be received in real-time communication, the step being carried out by said mobile wireless terminal.

26. A mobile wireless terminal used in combination with a radio-signal base station in a wireless communication system, said radio-signal base station, when said radio-signal base station receives packet signals addressed to a mobile wireless terminal being in a power-saving mode, temporarily storing the received packet signals until said mobile wireless terminal requests said radio-signal base station to transmit said packet signals thereto,
  wherein said mobile wireless terminal operates in a power-saving mode in which said mobile wireless terminal intermittently receives packet signals, and in a normal mode in which said mobile wireless terminal regularly receives packet signals, and
  said mobile wireless terminal requests said radio-signal base station to transmit said packet signals thereto and transfers to said normal mode from said power-saving mode, if said mobile wireless terminal judges that the received packet signals are packet signals to be received in real-time communication, receives entirety of said packet signals in said normal mode, and transfers to said power-saving mode when said packet signals have been all received in real-time communication, and
  wherein if said mobile wireless terminal judges that it would not be necessary to carry out real-time communication for receiving entirety of said packet signals, said mobile wireless terminal intermittently receives said packet signals at a certain interval in said power-saving mode.

27. The mobile wireless terminal as set forth in claim 26, wherein if said mobile wireless terminal judges that the received packet signals are packet signals not necessary to be received in real-time communication, said mobile wireless terminal transfers to said power-saving mode from said normal mode.

28. The mobile wireless terminal as set forth in claim 26, wherein said mobile wireless terminal transfers to said power-saving mode when entirety of said packet signals has been received.

29. The mobile wireless terminal as set forth in claim 26, wherein said mobile wireless terminal is aware that packet signals addressed to said mobile wireless terminal are stored in said radio-signal base station, by analyzing a informative signal periodically transmitted from said radio-signal base station.

30. The mobile wireless terminal as set forth in claim 29, wherein said mobile wireless terminal receives said informative signal in said power-saving mode at an interval determined by itself.

31. The mobile wireless terminal as set forth in claim 29, wherein said mobile wireless terminal receives said packet signals at an interval at which said mobile wireless terminal receives said informative signal from said radio-signal base station.

32. The mobile wireless terminal as set forth in claim 29, wherein said mobile wireless terminal receives said packet signals at an interval equal to N×I, wherein said I indicates an interval at which said mobile wireless terminal receives said informative signal from said radio-signal base station, and said N is a positive integer equal to or greater than two (2).

33. The mobile wireless terminal as set forth in claim 26, wherein said mobile wireless terminal sets a longer interval at which said mobile wireless terminal receives said packet signals, for a smaller frequency at which said packet signals are transmitted from said radio-signal base station.

34. The mobile wireless terminal as set forth in claim 26, wherein said mobile wireless terminal sets a longer interval at which said mobile wireless terminal receives said packet signals, if said mobile wireless terminal cannot receive said informative signal from said radio-signal base station.

35. The mobile wireless terminal as set forth in claim 26, wherein said mobile wireless terminal checks whether the received packet signals include data indicative of commencement of real-time communication, and if the received packet signals include such data, said mobile wireless terminal judges said packet signal to be received in real-time communication.

36. The mobile wireless terminal as set forth in claim 26, wherein said mobile wireless terminal checks whether the received packet signals include real-time transmission protocol, and if the received packet signals include said real-time transmission protocol, said mobile wireless terminal judges said packet signal to be received in real-time communication.

37. The mobile wireless terminal as set forth in claim 26, wherein said mobile wireless terminal is comprised of a cellular phone.

38. The mobile wireless terminal as set forth in claim 26, wherein said mobile wireless terminal includes functions of:
  when said mobile wireless terminal transfers to said power-saving mode from said normal mode, informing said radio-signal base station of such mode-transfer;
  determining an interval at which said mobile wireless terminal receives signals, said interval being equal to N×I wherein N is a positive integer equal to or greater than two (2), and I indicates an interval at which said radio-signal base station transmits said announce signal;
  receiving said informative signal from said radio-signal base station at said interval when said mobile wireless terminal is in said power-saving mode;
  if the received informative signal includes information indicating that said radio-signal base station stores packet signals addressed to said mobile wireless terminal, requesting said radio-signal base station to transmit said packet signals to said mobile wireless terminal;
  judging whether said packet signals are necessary to be received in real-time communication, based on a protocol of the received packet signals;
  requesting said radio-signal base station to transmit all of said packet signals to said mobile wireless terminal, and transferring to said normal mode from said power-saving mode;
  transferring to said power-saving mode from said normal mode when said packet signals have been all transmitted to said mobile wireless terminal.

* * * * *